(12) United States Patent
Roberts

(10) Patent No.: US 8,200,718 B2
(45) Date of Patent: Jun. 12, 2012

(54) PARALLELIZED, INCREMENTAL GARBAGE COLLECTOR

(76) Inventor: Michael L. Roberts, San Bruno, CA (US)

( * ) Notice: Subject to any disclaimer, the term of this patent is extended or adjusted under 35 U.S.C. 154(b) by 231 days.

(21) Appl. No.: 12/497,427

(22) Filed: Jul. 2, 2009

(65) Prior Publication Data

US 2011/0004641 A1    Jan. 6, 2011

(51) Int. Cl.
*G06F 17/30* (2006.01)
(52) U.S. Cl. ......... 707/813; 707/814; 707/816; 707/820
(58) Field of Classification Search ........................ None
See application file for complete search history.

(56) References Cited

U.S. PATENT DOCUMENTS

| | | | |
|---|---|---|---|
| 4,775,932 A | 10/1988 | Oxley et al. | |
| 5,560,003 A | 9/1996 | Nilsen et al. | |
| 5,692,189 A * | 11/1997 | Lipe ................... | 713/1 |
| 6,199,075 B1 | 3/2001 | Ungar et al. | |
| 6,317,872 B1 * | 11/2001 | Gee et al. ....................... | 717/152 |
| 6,353,838 B2 | 3/2002 | Sauntry et al. | |
| 6,526,421 B1 * | 2/2003 | Houldsworth ....................... | 1/1 |
| 7,111,294 B2 | 9/2006 | Steensgaard | |
| 7,512,745 B2 * | 3/2009 | Gschwind et al. ............. | 711/147 |
| 7,529,786 B2 | 5/2009 | Andreasson | |
| 7,831,961 B1 * | 11/2010 | Bush et al. ..................... | 717/124 |
| 2002/0199000 A1 * | 12/2002 | Banerjee ........................ | 709/227 |
| 2004/0260732 A1 * | 12/2004 | Chauvel et al. ............... | 707/200 |
| 2009/0006402 A1 * | 1/2009 | Bohle et al. ........................ | 707/8 |
| 2010/0114998 A1 * | 5/2010 | Steensgaard et al. ......... | 707/813 |

OTHER PUBLICATIONS

Domani et al., "A Generational On-the-fly Garbage Collector for Java," ACM SIGPLAN Notices, vol. 35 Issue 5, May 2000.*
Kamada et al., "Efficient Parallel Global Garbage Collection on Massively Parallel Computers," Supercomputing '94 Proceedings of the 1994 conference on Supercomputing.*
Hudak et al., "Garbage Collection and Task Deletion in Distributed Applicative Processing Systems," LFP '82 Proceedings of the 1982 ACM symposium on LISP and functional programming.*
Huelsbergen et al., "Very Concurrent Mark-&-Sweep Garbage Collection without Fine-Grain Synchronization," Oct. 1998, ISMM '98.*
Uhrig et al., "A Garbage Collection Technique for Embedded Multithreaded Multicore Processors," Apr. 7, 2009, ARCS 2009.*
"Garbage collection (computer science)", www.wikipedia.com, May 5, 2009, 9 pages.
"Actor model", www.wikipedia.com, May 5, 2009, 17 pages.

(Continued)

*Primary Examiner* — Charles Kim
*Assistant Examiner* — Grace Park
(74) *Attorney, Agent, or Firm* — Ray K. Shahani, Esq.; Kin H. Lai

(57) ABSTRACT

A method for garbage collection in which resources used by data objects in a computer program that are not accessed in the future are reclaimed, the method consists of the following steps of 1. Providing a tracing garbage collector which is both parallelized and incremental; 2. Integrating the collector with the computer program to create the mutator; 3. Instructing the mutator to scan and collect resources used by data objects in a computer program that are not accessed in the future simultaneously on all threads in small amounts; and 4. Interleaving the mutator scanning and collection with unrelated processing by the computer program such that all of the threads in the application are never stopped simultaneously for any portion of the collection cycle.

41 Claims, 27 Drawing Sheets

OTHER PUBLICATIONS

Konstantinos Sagonas et al., "Message analysis-guided allocation and low-pause incremental garbage collection in a concurrent language", International Symposium on Memory Management, 2004, p. 1-12.

Jeremy H. Brown, "Massively Parallel Garbage Collection", www.ai.mit.edu, 5 pages.

Daniel Spoonhower et al., "Parallel, Real-Time Garbage Collection", Sep. 21, 2005, 33 pages.

Perry Cheng, "Scalable Real-time Parallel Garbage Collection for Symmetric Multiprocessors", Sep. 24, 2001.

Katherine Barabash et al., "A parallel, incremental, mostly concurrent garbage collector for servers", ACM Transaction on Prog. Lang. and Systems (TOPLAS), vol. 27, Issue 6, Nov. 2005, p. 1097-1146.

* cited by examiner

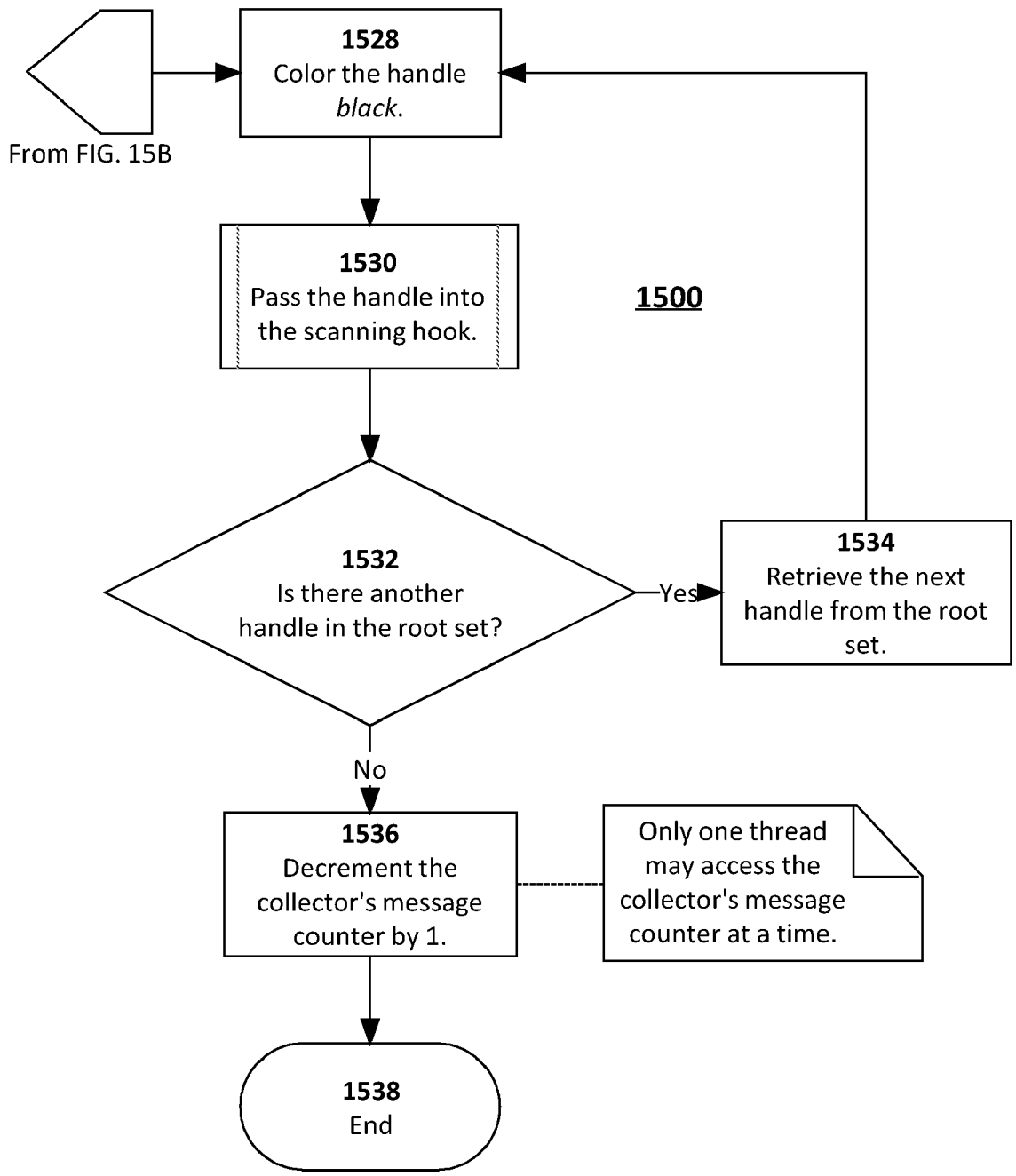

Sample Mutator (cont.)

PARALLELIZED, INCREMENTAL GARBAGE COLLECTOR

FIELD OF THE INVENTION

The invention relates to automated memory management processes known as garbage collection in the field of computer science, and more particularly to a method and device for performing parallelized, incremental garbage collection in order to prevent the occurrence of stop the world-type computer thread processing and minimize synchronization thereof.

BACKGROUND OF THE INVENTION

In computer science, garbage collection (GC) is a form of automatic memory management. The garbage collector, or just collector, attempts to reclaim garbage, or memory used by objects that will never be accessed or mutated again by the application or computer program. Garbage collection was invented by John McCarthy around 1959 to solve the problems of manual memory management in Lisp.

Garbage collection is the opposite of manual memory management, which requires the programmer to specify which objects to deallocate and return to the memory system. However, many systems use a combination of the two approaches.

A typical tracing garbage collector maintains a set, U, of all memory objects known to the collector. During a collection cycle, the collector's task is to categorize all objects as either mutable or immutable. Mutable objects are objects that the mutator, i.e., the computer program, is able to read from or write to because the mutator has retained references, to the object in somewhere in memory. Objects that have no remaining references in the application's domain are considered immutable. The programmer provides the collector with a set of objects that are to be prejudged as mutable. The collector uses this set, the root set, as roots of a graph composed of objects, i.e., the vertices, and references, i.e., the edges. As the collector traverses this graph, objects are added to the mutable set M. When the graph has been completely traversed, all of the objects in U that do not also belong to M, i.e., U-M, are considered immutable and safe to collect.

Many applications or computer programs, such as those with real-time constraints and those that maintain large heaps, cannot afford to stop processing long enough so that the collector can compute all immutable objects in memory. Incremental garbage collection addresses this issue by splitting the work of a single collection cycle into small parts, interrupting the application/computer program frequently for small periods of time instead of interrupting the application/computer program relatively infrequently for potentially long periods of time.

Previous attempts to parallelize garbage collection incur a bottleneck, commonly referred to as "stop the world," meaning that all threads in the application must be stopped for a portion of the collection cycle. Long pauses are anathema to parallelism, as shown in FIG. 4. The task of parallelizing incremental collection represents even more of a challenge to implement without defeating the benefits of parallelization completely.

Tri-Color Marking

Most modern tracing garbage collectors implement some variant of the tri-color marking abstraction, but simple collectors, such as the mark-and-sweep collector, often do not make this abstraction explicit.

FIG. 1 (prior art) is a schematic view of a "tri-color" garbage collector algorithm 80. Tri-color marking works as follows:

1. Create initial white W, grey G, and black B sets; these sets will be used to maintain progress during the cycle. Initially the white W set or condemned set is the set of objects that are candidates for having their memory recycled. The black B set is the set of objects that can be proven to have no references to objects in the white W set; this diagram in FIG. 1 (prior art) demonstrates an implementation that starts each collection cycle with an empty black B set. The grey G set is all the remaining objects that may or may not have references to objects in the white W set and elsewhere. These sets partition memory; every object in the system, including the root set, is in precisely one set.

2. Mark the root set grey. This step is important since both the black and the grey sets start off empty.

3. Pick an object from the grey G set. Blacken this object, i.e., move it to the black B set, by greying all the white W objects it references directly.

4. Repeat the previous step until the grey G set is empty.

5. When there are no more objects in the grey G set, then all the objects remaining in the white W set are safe to consider unreachable and the storage occupied by them can be reclaimed safely.

The tri-color marking algorithm preserves an important invariant: "No black B object points directly to a white W object." This ensures that the white W objects can be safely destroyed once the grey G set is empty.

The tri-color method has an important advantage: it can be performed 'on-the-fly', without halting the system for significant time periods. This is accomplished by marking objects as they are allocated and during mutation, maintaining the various sets. By monitoring the size of the sets, the system can perform garbage collection periodically, rather than as-needed. Also, the need to touch the entire working set each cycle is avoided.

FIG. 2 (prior art) is a schematic view of the traditional actor model 90. The actor model has been described with respect to parallel programming in computing. In a network of active objects, all processes run concurrently and communicate through messaging. As an example, the internet is a model network in which each computer is an actor and all actors interact together in essentially real-time. Each actor has both a state and a thread of execution. The degree of parallelism is related to the degree of time-sharing, and not all messages can receive an immediate response. It will be understood, therefore, that with synchronous communication, there is the need to stop a thread in anticipation of a response, but with asynchronous processing, there is no need to wait.

ADVANTAGES AND SUMMARY OF THE INVENTION

It is an object and advantage of the present invention to provide a garbage collector which is both parallelized and incremental.

It is another object and advantage of the present invention to provide a garbage collector which never "stops the world". The present invention also resolves the impedance problem between parallel and incremental collection so that garbage collection can be used in multithreaded applications or computer programs with large heaps and in multithreaded applications within the soft real-time and real-time spectrum. It will be understood that while prior art including U.S. Pat. No. 6,199,075, mentions "multiple processing units" instead of "threads." The present invention describes the process in terms of threads because that's a paradigm in which programmers work, the term is also less abstract. The term "multiple processing units" is potentially a broader term than "threads", since a "processing unit" could be a CPU, a thread, or an actor. It will be understood that in the present invention, a "thread" is not defined as a CPU or an actor.

It is yet another object and advantage of the present invention to provide a programmable garbage collector which does not create threads internally, thus leaving the programmer to determine which thread topology best suits the needs of the mutator.

It is an object and advantage of the present invention to provide a garbage collector that minimizes synchronization.

It is an object and advantage of the present invention to provide a garbage collector which is portable to any platform that supports simple synchronization primitives such as mutexes.

It is yet a further object and advantage of the collector of the present invention to integrate such collector into a language or virtual machine that uses garbage collection, for example JAVA, NET, or a CPU emulator. The collector of the present invention can be integrated through the interpreter or virtual machine or integrated directly into the program generated by a compiler.

An embodiment of the present invention comprises management of database resources such as in the use of the algorithm applied to file systems, as well as to collection of objects in memory.

The collector of the present invention also intends to satisfy real-time constraints of parallelized, incremental garbage collection.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 15A, 15B and 15C collectively show a flowchart showing the process "Scan" message and response steps used to initiate the scan phase as identified in Table III.

DETAILED DESCRIPTION OF THE PREFERRED EMBODIMENT

Figure 1:
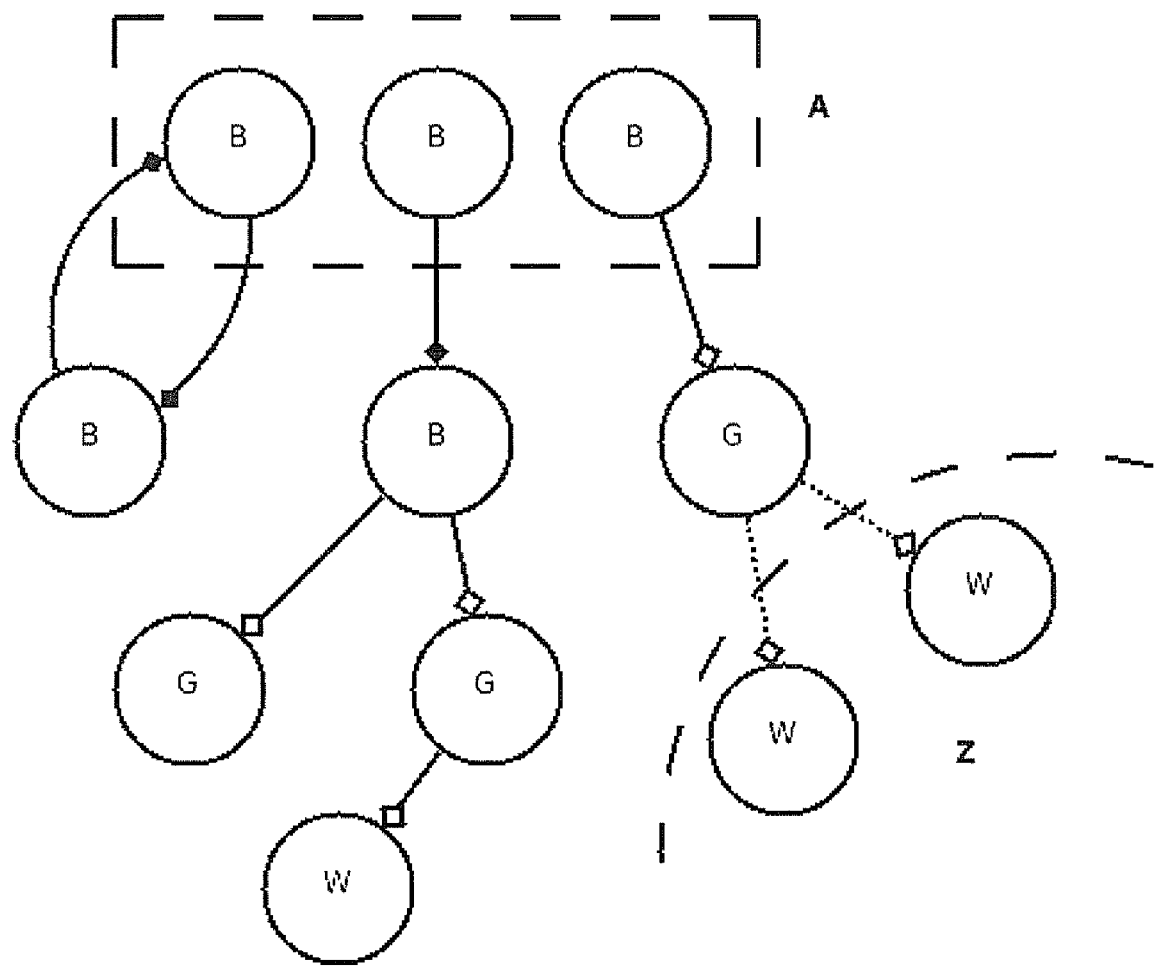
FIG. 1 (prior art) is a schematic view of a"tri-color" garbage collector algorithm 80.
Figure 2:
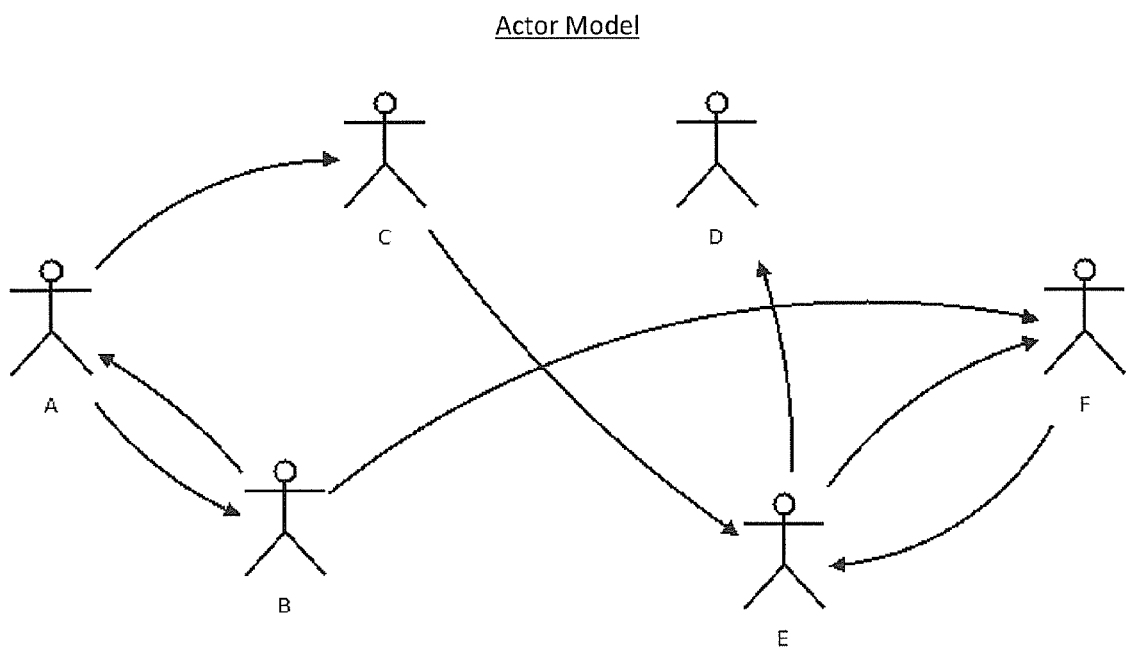
FIG. 2 (prior art) is a schematic view of the traditional actor model 90.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

Terminology:

The garbage collector described in this document will be referred to as the collector or the algorithm.

The application or computer program integrated with the collector is called the mutator.

The programmer is the person that integrates the mutator with the collector.

Figure 3:
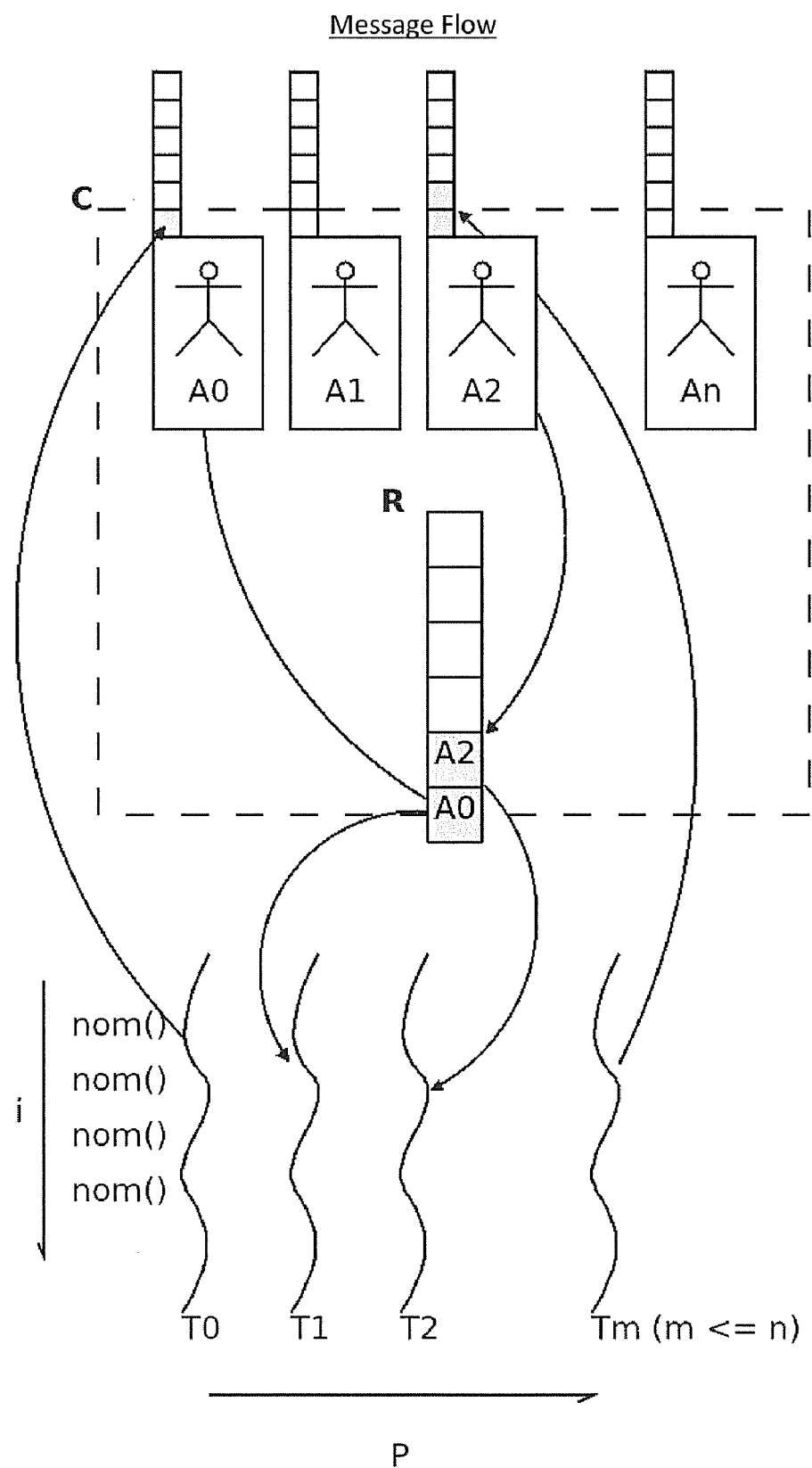
FIG. 3 is a schematic view of the message flow in the garbage collector process 100 of the present invention.

FIG. 3 is a schematic view of the message flow in the garbage collector process 100 of the present invention.

Figure 4:
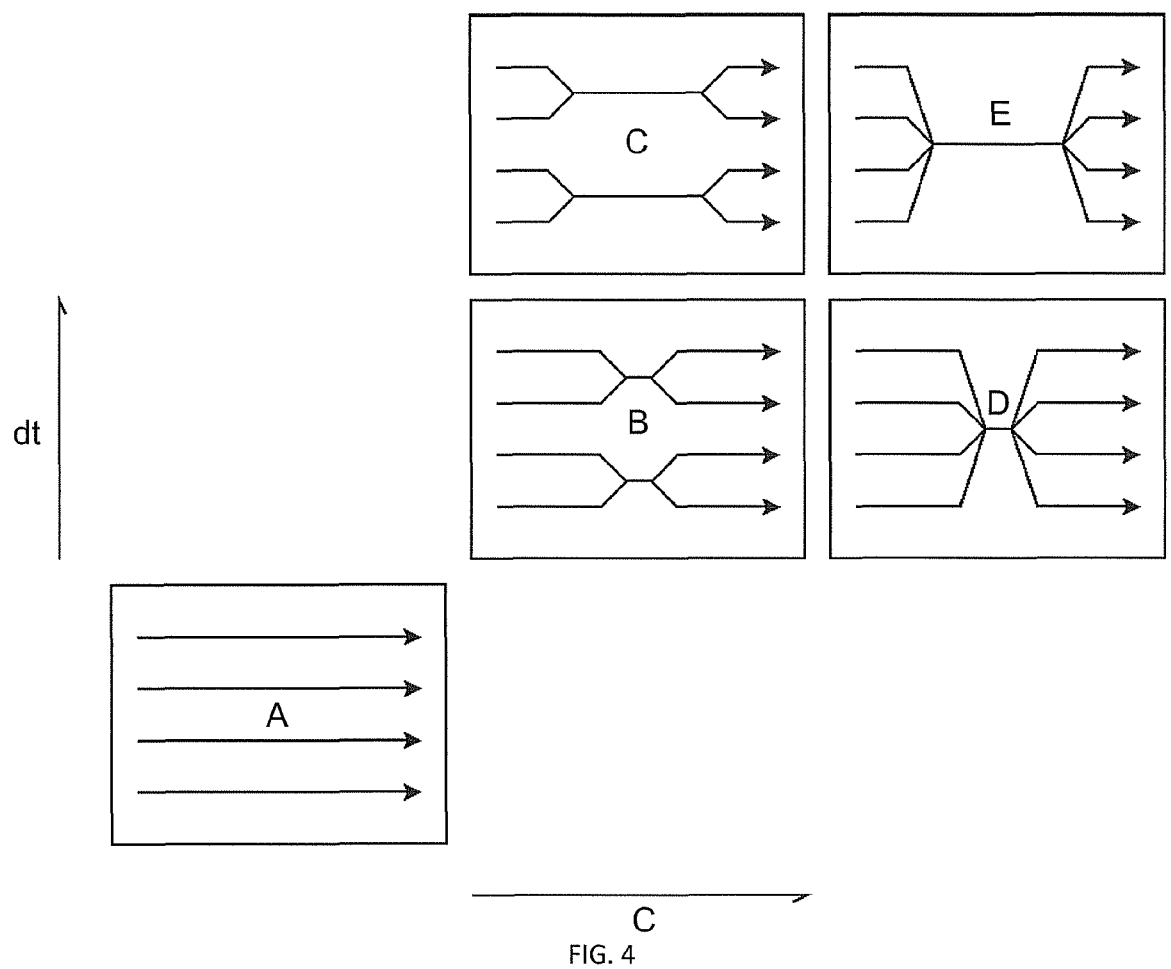
FIG. 4 is a graph showing schematic views of synchronization patterns used to parallelize the collection algorithm according to the garbage collector process 100 of the present invention.

FIG. 4 is a graph showing schematic views of synchronization patterns used to parallelize the collection algorithm according to the garbage collector process 100 of the present invention. The X axis represents increasing amounts of contention and the Y axis represents an increasing quantity of processing time that must be serialized between competing threads. The closest schematic to the origin represents the ideal where no process synchronization is needed and no bottleneck exists.

Properties:

The collector is both parallelized and incremental. The mutator can scan and collect simultaneously on all threads and do so in small amounts, interleaved with unrelated processing.

The collector never "stops the world." The collector does not create threads internally, leaving the programmer to determine which thread topology best suits the needs of the mutator. The programmer can choose to call the incremental processing function while processing an allocation call, or can decide to dedicate a number of threads to the task of garbage collection. The programmer also has the option to eschew threading altogether, though this collector would not perform as well as traditional, single-threaded incremental collectors.

The collector minimizes synchronization, which is limited to queue operations, a single counter, and a hook whose synchronization needs, if any, are dependent upon the mutator's needs.

The collector does not implement a specialized, internal allocator. Instead, the collector is designed to be used with any allocator that uses common allocate and deallocate semantics. The collector does not need to be modified if the programmer wishes to use memory pooling or to address the issue of memory fragmentation though an optimized allocator.

The collector should be portable to any platform that supports simple synchronization primitives such as mutexes.
Interface:

This algorithm collects handles, which represent objects in memory that are potentially collectible. Exactly what a handle is is determined by how the programmer integrates the collector with the mutator and in most situations it is expected that a handle will simply be defined as the address of a structure in memory whose definition is well known to the programmer.

The programmer can also request that the collector pin (or unpin) handles. Pinned handles are considered noncollectable and use a reference counter to determine how long a handle should be pinned. At least one handle must be pinned for the collector to be function.

Introducing a new handle to the collector produces a pinned handle. This is necessary because the collector is capable of identifying objects as immutable before they have been referenced for the first time. The programmer is responsible for unpinning the handle once it is referenced by another handle known to be mutable.

Table 1 summarizes the basic interface the collector exposes to the programmer. Functions with an asterisk (*) are only intended to be called by the scanning hook:

The programmer is responsible for providing associated storage for a handle's color, reference count, and for an additional value that aids the collector in binding a handle to a message processor. It is reasonable to pack these values into a single 32-bit number or use lookup tables to retrieve values for the collector.

The programmer must supply an implementation of a scanning hook that determines how the collector is to discover mutable handles given a handle that is already known to be mutable (or uncollectable). This function must be thread-safe: the collector must be able to scan the handle's associated data for references without the danger of the data being simultaneously changed to by another thread. The collector does not write, so read-only data requires no synchronization.

It will be understood that the idea of never stopping two threads simultaneously is a theoretical ideal. Sometimes it can be accomplished, however sometimes it cannot. When it cannot, the collector is designed in such a way that the number of threads simultaneously stopped on a given occasion is minimized. This is called minimization of contention. Furthermore, the amount of time a given thread maintains exclusive access to a resource—this is called lock scope—is also minimized. As best shown in FIG. 4, it depicts a literal representation of contention but not of lock scope, both contention and lock scope contribute to how long a given number of threads are simultaneously stopped.

Figure 5:
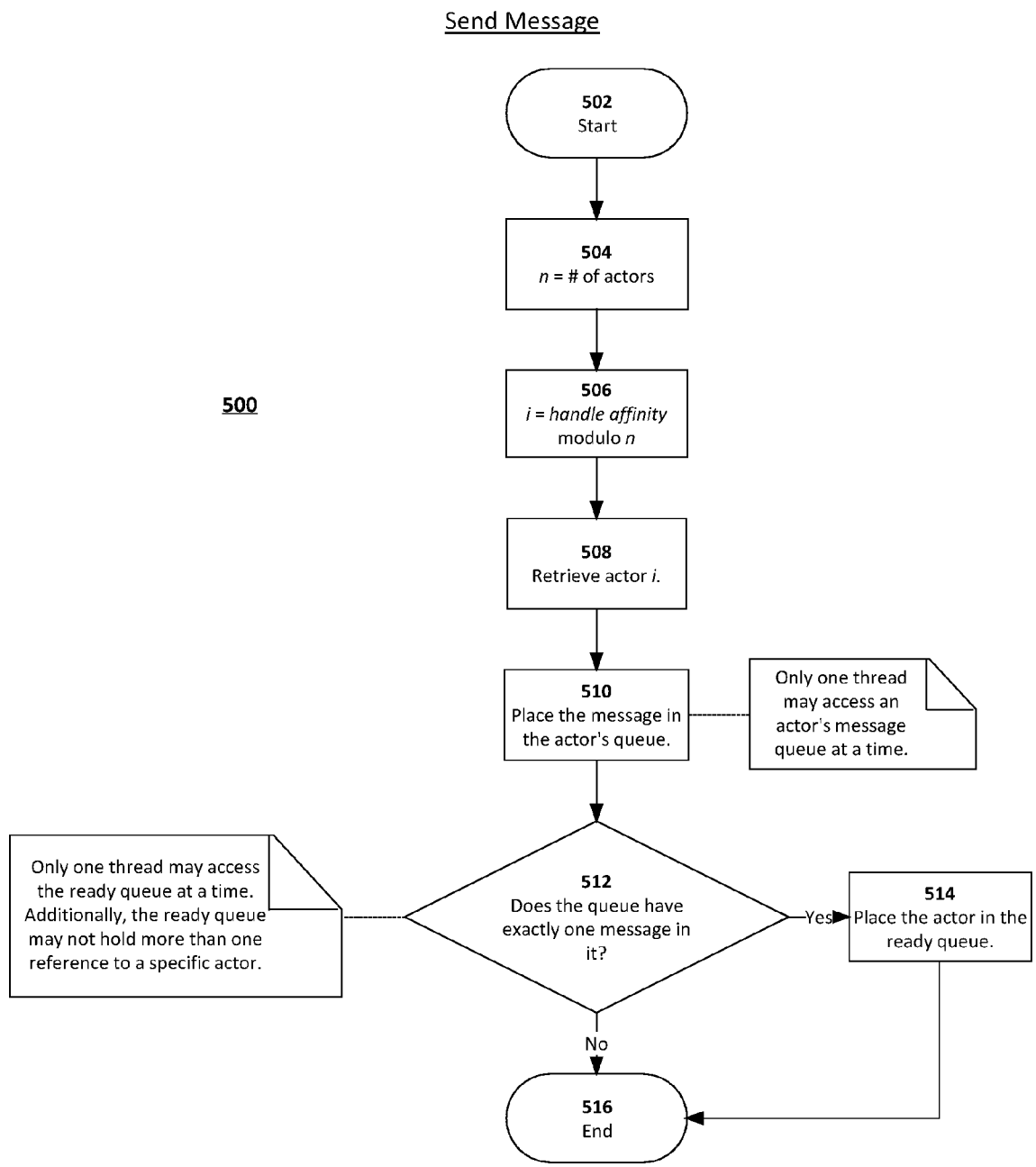
FIG. 5 is a flowchart showing "Send a Message" function steps used by various interface functions to send a message.
Figure 6:
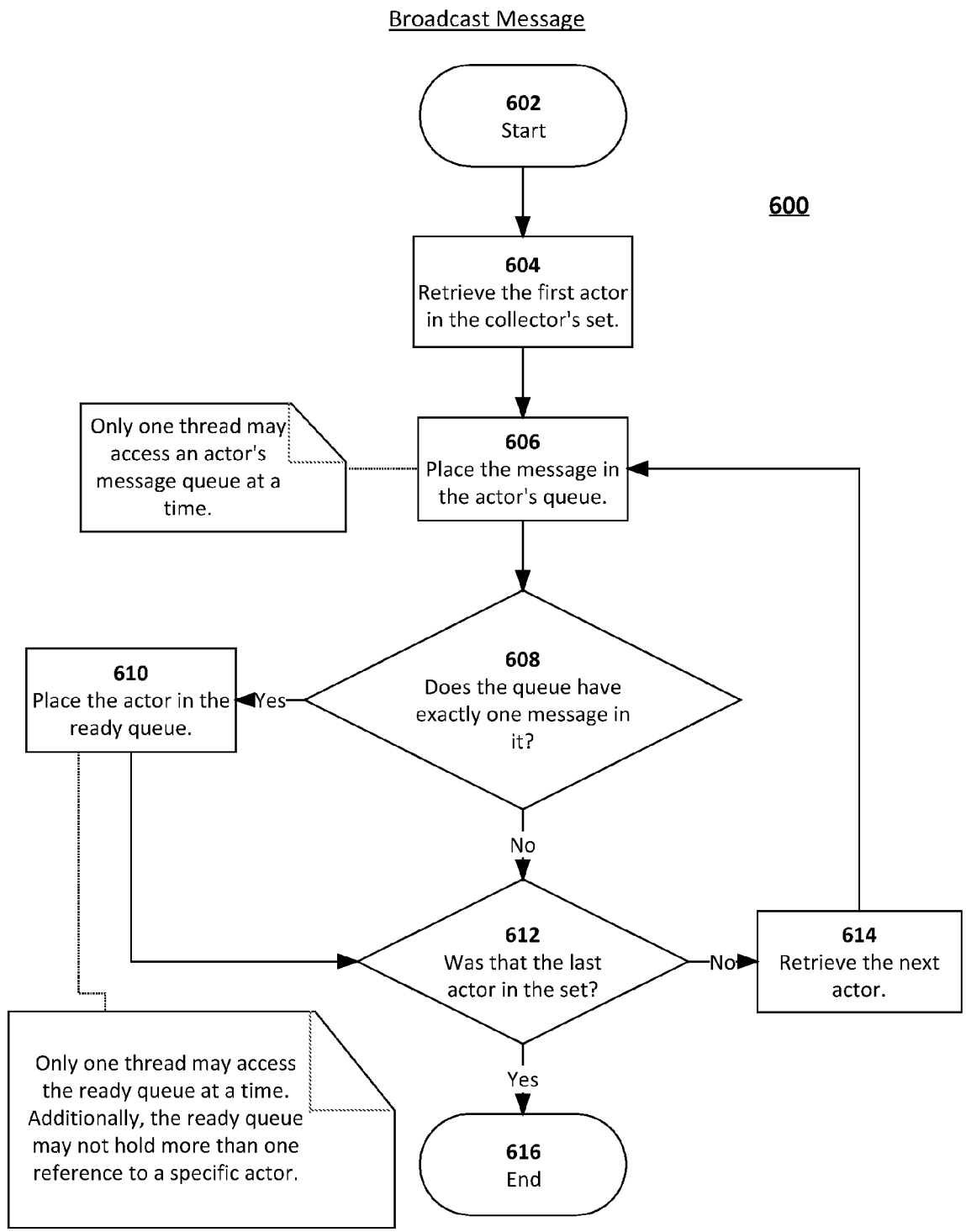
FIG. 6 is a flowchart showing "Broadcast a Message" function steps used by various interface functions to broadcast a message.

FIG. 5 is a flowchart showing "Send a Message" function 500 steps used by various interface functions to send a message. FIG. 6 is a flowchart showing "Broadcast a Message" function steps used by various interface functions to broadcast a message. "Send a Message" and "Broadcast a Message" are subroutines that are used by the other flowcharts, i.e., there are references to both sending and broadcasting message references in the interface function subroutine blocks. "Send a Message" also demonstrates how the collector knows which actor is responsible for a given handle, i.e., which actor the handle is bound to.

"Send a Message" function 500 subroutine is initiated by Start step 502. The number n is set to be equal to the number of actors in step 504. In step 50, i is equivalent to handle affinity modulo n in step 508, actor i is retrieved. Step 510 comprises placing the message in the actor's queue. NOTE: Only one thread may access an actor's message queue at a time. In step 512, a query is made as to whether or not the queue has exactly one message in it. NOTE: Only one thread may access the ready queue at a time. Additionally, the ready

TABLE I

Summary of Interface Functions

| Name | Description | Effect |
|---|---|---|
| Introduction | Introduces a handle to the collector. | The collector initializes the handle's collection state and pins the object. The programmer is expected to unpin the handle when it is known to be referenced by another handle that is already known to the collector. |
| Quit | Shut down the collector. | The collector sends a quit message to each actor. |
| Nom | Collect incrementally | If an actor is on the ready queue, the caller's thread processes a single message from the actor's queue. If no outstanding messages remain in the current phase, send the message that initiates the next phase to each actor. |
| Pin | Pin a handle | The collector sends a pin message to the actor that the handle is bound to. |
| Unpin | Unpin a handle | The collector sends an unpin message to the actor that the handle is bound to. |
| Identify* | Identify a referenced handle. | The collector sends a blacken message to the actor the handle is bound to. | queue may not hold more than one reference to a specific actor. If the result of step 512 is yes, then step 514 consists of placing the actor in the ready queue. If the result of step 512 is no, then step 516 is termination of the subroutine.

"Broadcast a Message" function 600 subroutine is initiated by Start step 602. The first actor in the collector's set is retrieved in step 604. In step 606, the message is placed in the collector's set. NOTE: Only one thread may access an actor's message queue at a time. In step 608, a query is made as to whether or not the queue has exactly one message in it. NOTE: Only one thread may access the ready queue at a time. Additionally, the ready queue may not hold more than one reference to a specific actor. If the result of step 608 is yes, then step 610 consists of placing the actor in the ready queue and proceeding to step 612. If the result of step 608 is no, then it will directly proceed to step 612 wherein a query is made as to whether or not the actor is the last actor in the set. If the result of step 612 is yes, step 616 is termination of the subroutine. If the result of step 612 is no, it will loop back to step 606.

Figure 7:
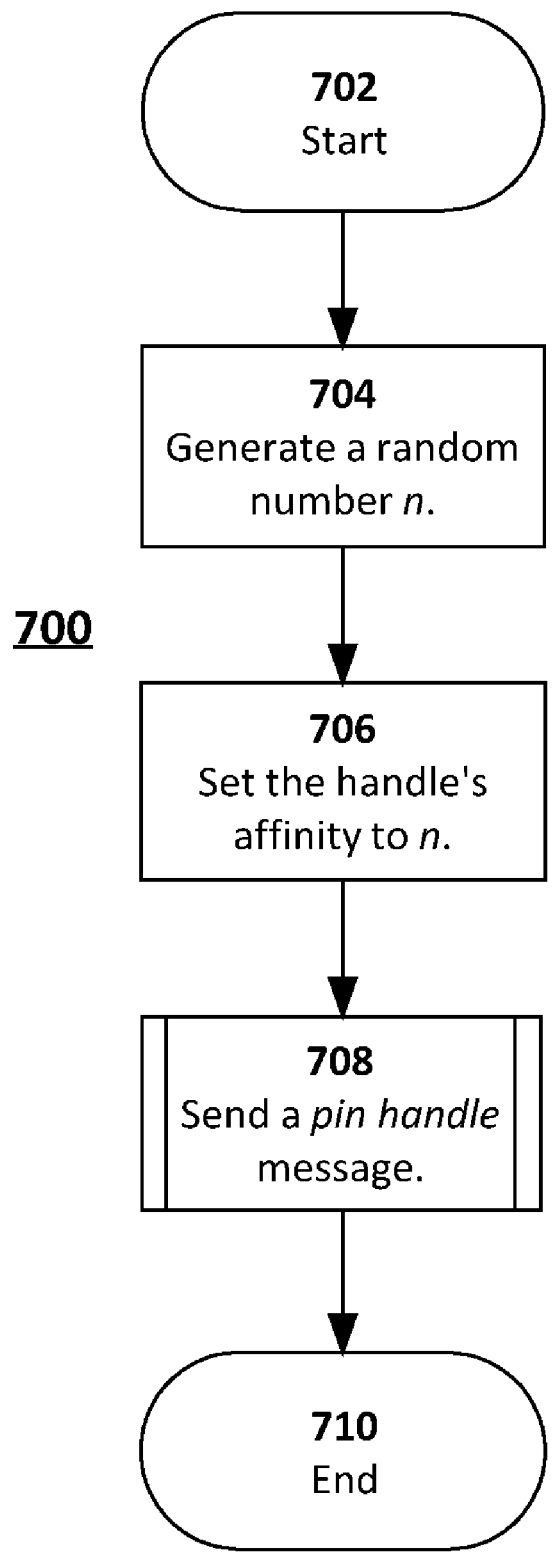
FIG. 7 is a flowchart showing "Introduce" function steps used to introduce a handle to the collector.

FIG. 7 is a flowchart showing "Introduce" function steps used to introduce a handle to the collector. "Introduce" function 700 subroutine is initiated by Start step 702. A random number n is generated in step 704. In step 706, the handle's affinity is set to n. Step 708 comprises sending a pin handle message. Then step 710 is termination of the subroutine.

Figure 8A:
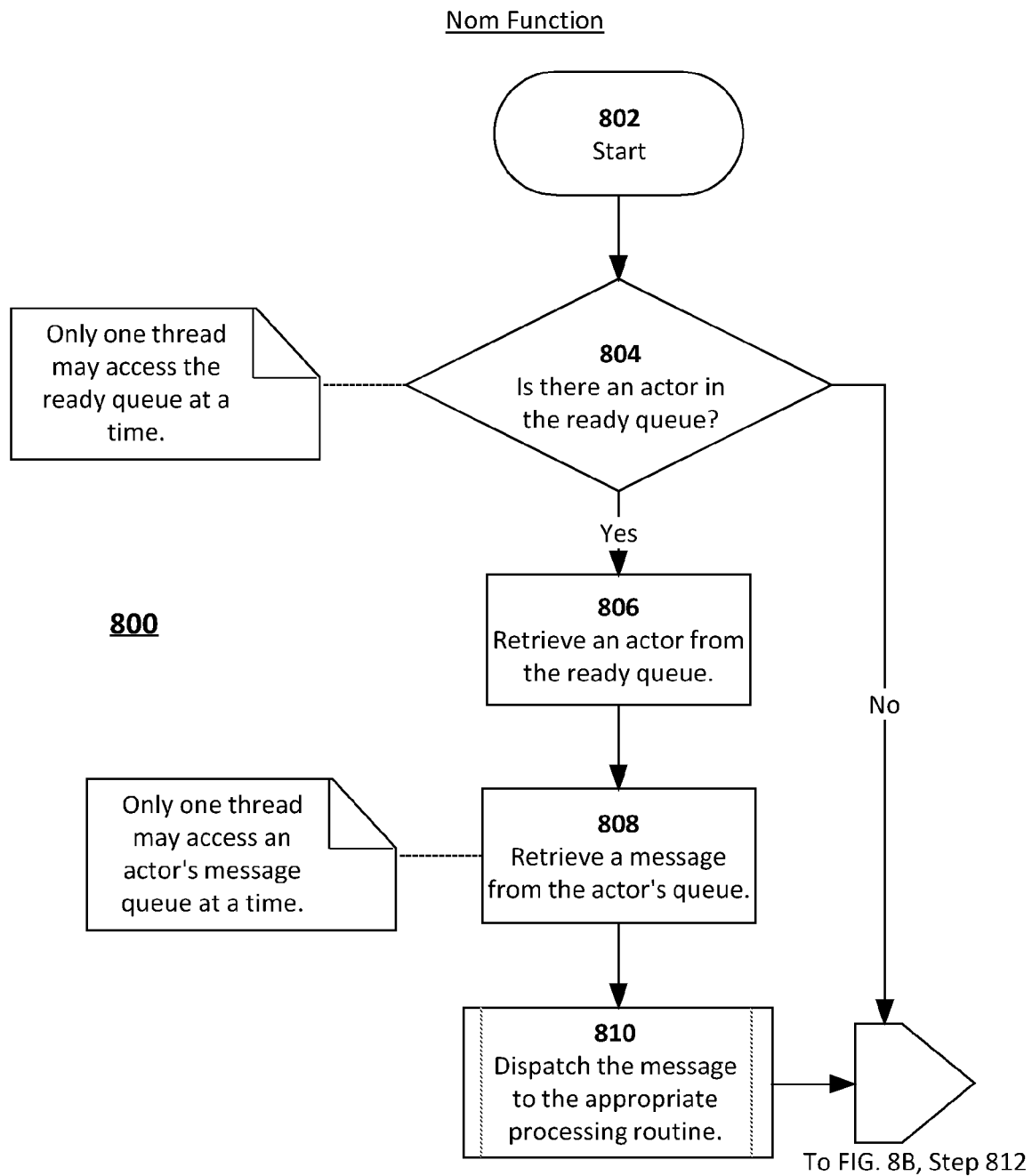
FIGS. 8A and 8B collectively show a flowchart showing "Nom" function steps used to collect incrementally.
Figure 8B:
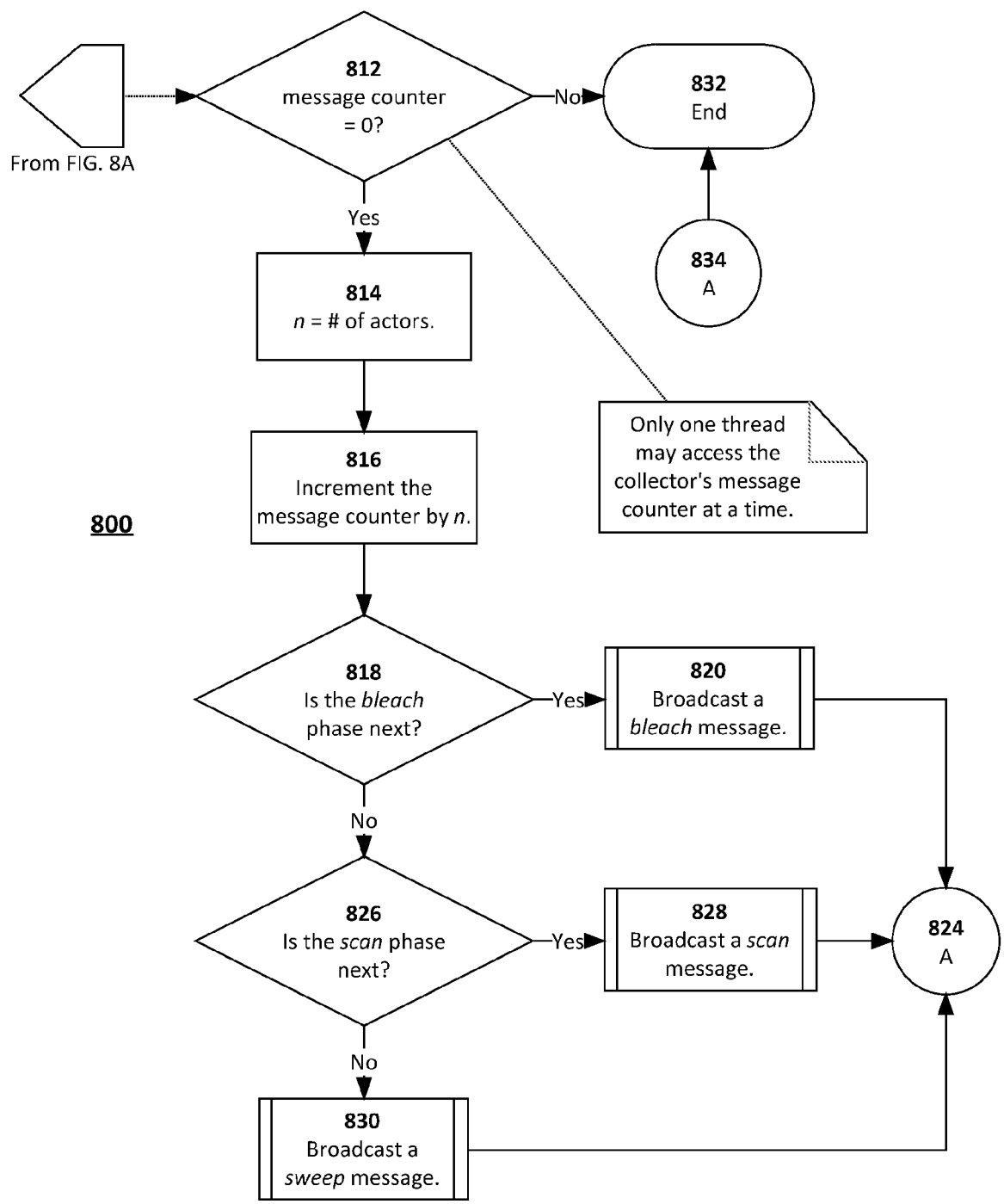

FIGS. 8A and 8B collectively show a flowchart showing "Nom" function steps used to collect incrementally. As best shown in FIG. 8A, "Nom" function 800 subroutine is initiated by Start step 802. In step 804, a query is made as to whether or not there is an actor in the ready queue. NOTE: Only one thread may access the ready queue at a time. If the result of step 804 is yes, then step 806 consists of retrieving an actor from the ready queue. Then in step 808, a message from the actor's queue is retrieved. NOTE: Only one thread may access an actor's message queue at a time. Subsequently in step 810, the message to the appropriate processing routine is dispatched and it will proceed to step 812, as best shown in FIG. 8B. However, if the result of step 804 is no, it will then proceed directly to step 812. As best shown in FIG. 8B, In step 812, a query is made as to whether or not the message counter equals to zero. NOTE: Only one thread may access the collector's message counter at a time. If the result of step 812 is no, then step 832 is termination of the subroutine. If the result of step 812 is yes, then in step 814 the number n is set to the number of actors. The in step 816, the message counter will be incremented by n. In step 818, a query is made as to whether or not the next phase is the bleach phase. If the result of step 818 is yes, it will proceed to step 820 in which a bleach message is broadcast and then it proceeds to connector shape A 824 which is a go to function to shape A 834 which connects to end routine 832. If the result of step 818 is no, it will proceed to step 826 wherein a query is made as to whether or not the subsequent phase is the scan phase. If the result of step 826 is yes, it will proceed to step 828 in which a scan message is broadcast and then it proceeds to connector shape A 824 which is a go to function to shape A 834 which connects to end routine 832. If the result of step 826 is no, it will proceed to step 830 in which a sweep message is broadcast and then it proceeds to connector shape A 824 which is a go to function to shape A 834 which connects to end routine 832.

Figure 9:
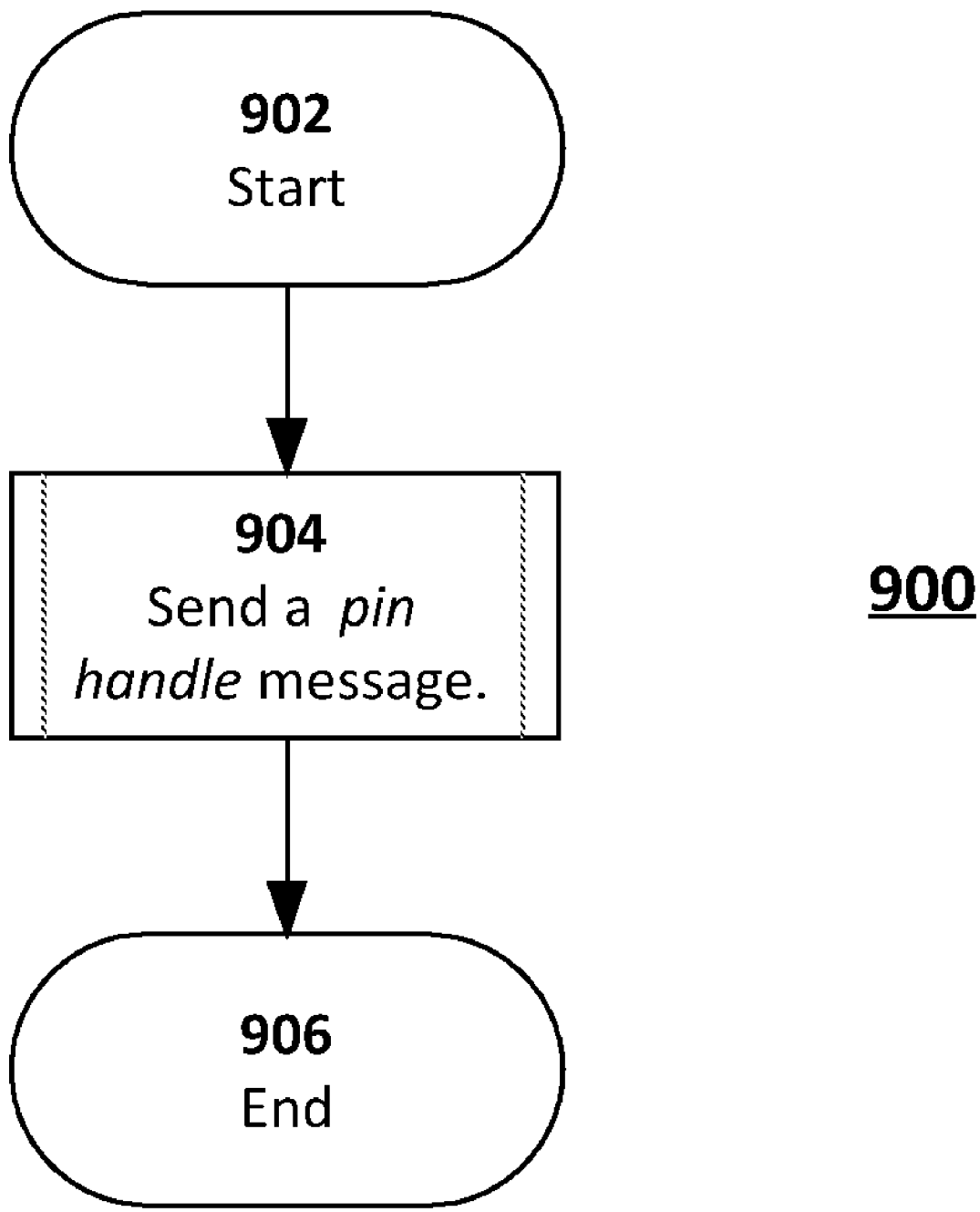
FIG. 9 is a flowchart showing "Pin" function steps used to pin a handle.

FIG. 9 is a flowchart showing "Pin" function steps used to pin a handle. "Pin" function 900 subroutine is initiated by Start step 902. In step 904, a pin handle message is sent, then step 906 is termination of the subroutine.

Implementation:

This collector uses a two-color system to find immutable objects. At the beginning of a collection cycle, white objects are not known to be mutable or immutable. As the collector traverses the graph of mutable objects, objects are colored black as they are discovered. At the end of a cycle, handles that are still white are considered immutable and are scheduled to be collected.

Table II shows each collection cycle divided into three phases, i.e., Bleach, Scan and Sweep phases:

TABLE II

Collection Cycle Phases:

| Name | Description |
| --- | --- |
| Bleach | Actors prepare their handles for the new collection cycle by coloring all handles that are not known to be uncollectable white. Actors also color handles within the root, recently pinned, and recently unpinned sets black. |
| Scan | Each actor prepares a new root set and beginning with this set scans each handle for references to white handles and blackens them. |
| Sweep | All mutable handles have been colored black. Any handle that is still colored white is collected. |

Once the final phase (sweep) is complete, the collector begins with the first phase (bleach) of the next cycle.

The collector divides work between specialized processing units called actors, which communicate through message passing. An actor with a message in its queue is placed on the ready queue. When a thread wishes to devote a small amount of time to collection, it invokes the nom function, which pulls a single actor off of the ready queue and processes the message in the actor's queue. In this fashion, the act of collection can be performed incrementally, one message at a time if necessary.

The collector maintains a count of outstanding unprocessed messages during a given phase. When this counter reaches zero, the collector knows to send the message that starts the next phase. This counter must be shared between threads and must therefore be synchronized. The production and consumption of "pin" and "unpin" messages does not affect the value of this counter because they can be sent during any phase of the collection cycle.

Each actor is assigned a unique number that is used to bind handles to it. The collector binds a handle to a specific actor for the lifetime of the object so that all messages with respect to that handle will be dispatched to the same actor. This guarantees that operations on the same handle will be serialized without the use of handle-specific synchronization objects and permits the use of passive operations where messaging would otherwise be necessary. The collector uses a random number generator to assign affinity values to actors. The collector is able to determine which actor the handle is bound to using by performing a modulo operation on the affinity and given a sufficiently high-quality random number generator, the collector maintains a uniform distribution of handles across all of its actors, independent of mutator's memory allocation patterns.

Each actor maintains a reference color, which is a record of the most recent value used to represent the color white. This value is a single bit that alternates between 1 and 0 from collection cycle to collection cycle as part of the bleach phase.

Each actor maintains a subset of handles that the have been introduced into the collector. Within this subset, the actor maintains several subsets that categorize the collection state of the handle. First, there are two sets of handles that represent colored objects that do not have a special collection state. Three sets are used to track handles with a special state: the root set, the recently pinned set, and the recently unpinned set. The recently pinned and unpinned sets contain those handles that are transitioning into and out of the root set. A handle cannot belong to multiple sets and being individually bound to a specific actor, moves from set to set passively as related messages are processed and the handle's associated collection state changes.

Table III summarizes the messages that each actor understands and its associated response. All messages are asynchronous. Messages marked with an asterisk (*) do not require a handle argument and are sent to every actor in the collector. Messages that require a handle argument are dispatched to the actor the handle is bound to. Messages marked with a tick symbol (') do not require the outstanding messages counter to be adjusted as they are produced and consumed.

Figure 13:
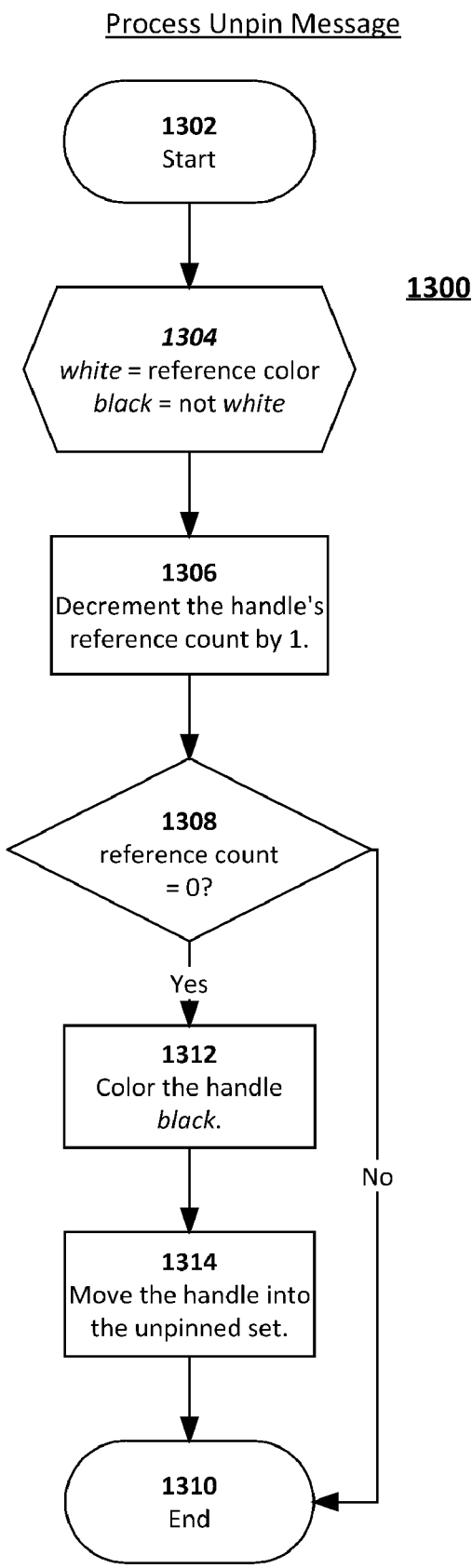
FIG. 13 is a flowchart showing the process "Unpin" message and response steps used to unpin a handle as identified in Table III.

FIG. 13 is a flowchart showing the process "Unpin" message and response steps used to unpin a handle as identified in Table III. "Process Unpin Message" function 1300 subroutine is initiated by Start step 1302. In step 1304, white is assigned as the reference color and black is assigned the not white color. Then in step 1306, the handle's reference count is reduced by 1. In step 1308, a query is made as to whether or not the reference count equals to 1. If the result of step 1308 is yes, it will proceed to step 1312 wherein the handle is colored black. Subsequently in step 1314, the handle is moved into the unpinned set. Then step 1310 is termination of the subroutine. If the result of step 1308 is no, it will proceed directly to step 1310 to terminate the subroutine.

Figure 14:
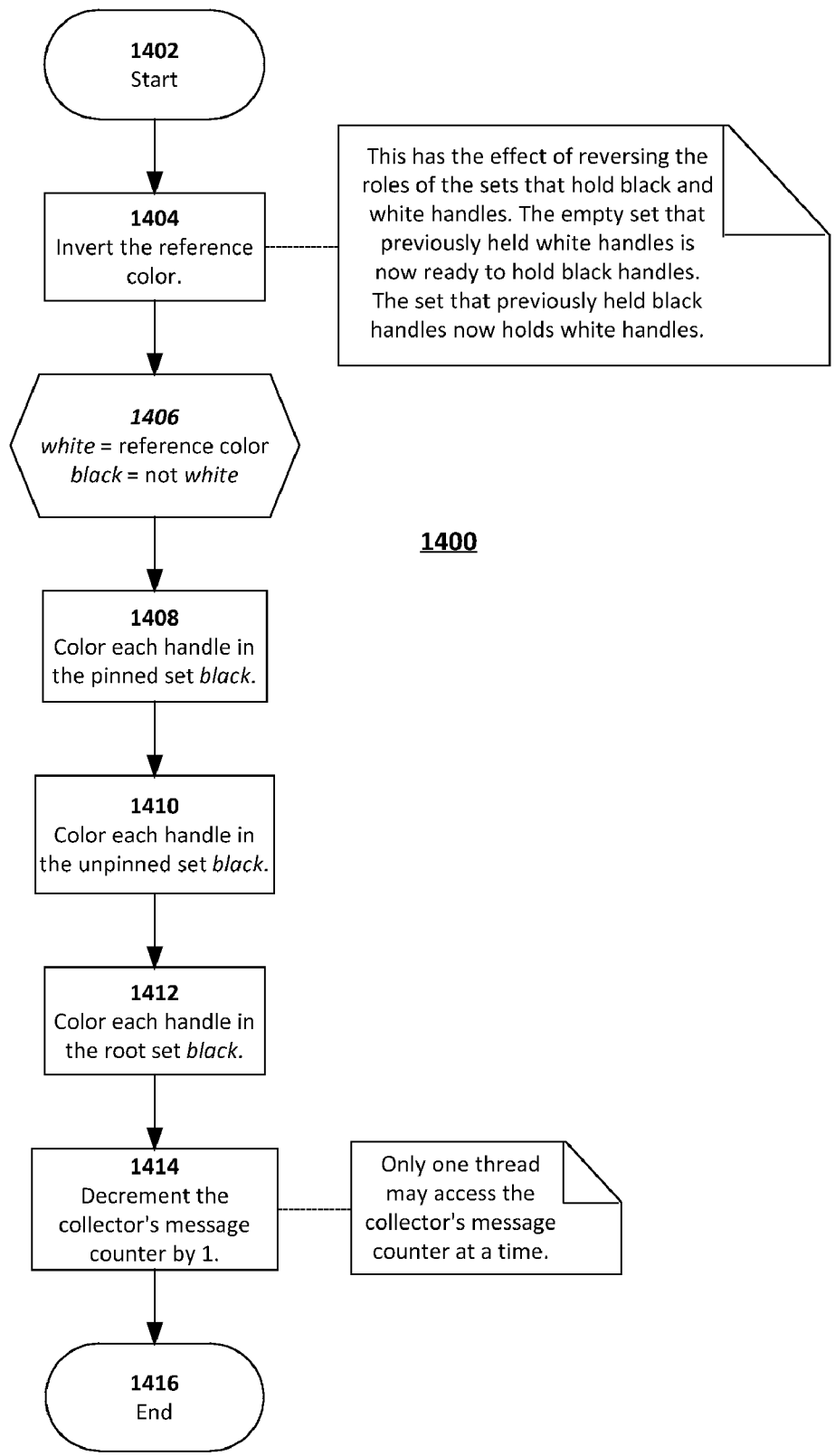
FIG. 14 is a flowchart showing the process "Bleach" message and response steps used to initiate the bleach phase as identified in Table III.

FIG. 14 is a flowchart showing the process "Bleach" message and response steps used to initiate the bleach phase as identified in Table III. "Process Bleach Message" function 1400 subroutine is initiated by Start step 1402. In step 1404,

TABLE III

Summary of the messages that each actor understands and its associated response:

| Name | Description | Response |
| --- | --- | --- |
| Pin' | "Pin" a handle | 1. increment the reference counter associated with the handle.<br>2. if the reference counter is now 1, color the handle black and move it into the recently pinned set. |
| Unpin' | "Unpin" a handle | 1. decrement the reference counter associated with the handle.<br>2. if the reference counter is now 0, color the handle black and move it into the recently unpinned set. |
| Bleach* | Initiates the bleach phase | 1. invert the reference color.<br>2. color all handles in the recently pinned set black.<br>3. color all handles in the recently unpinned set black.<br>4. color all handles in the root set black. |
| Scan* | Initiates the scan phase | 1. color the handles in the recently unpinned set black.<br>2. scan the recently unpinned set.<br>3. move the handles in the recently unpinned set into the black set.<br>4. move recently pinned objects into the root set.<br>5. scan the root set. |
| Blacken | Color a handle black and scan it. | 1. drop the message if the handle is already colored black.<br>2. color the handle black.<br>3. move the handle into the black set.<br>4. scan the handle. |
| Sweep* | Initiates the sweep phase | Collect all handles remaining in the white set. |
| Quit* | Cease collection | Signal that message processing should cease. |

Figure 10:
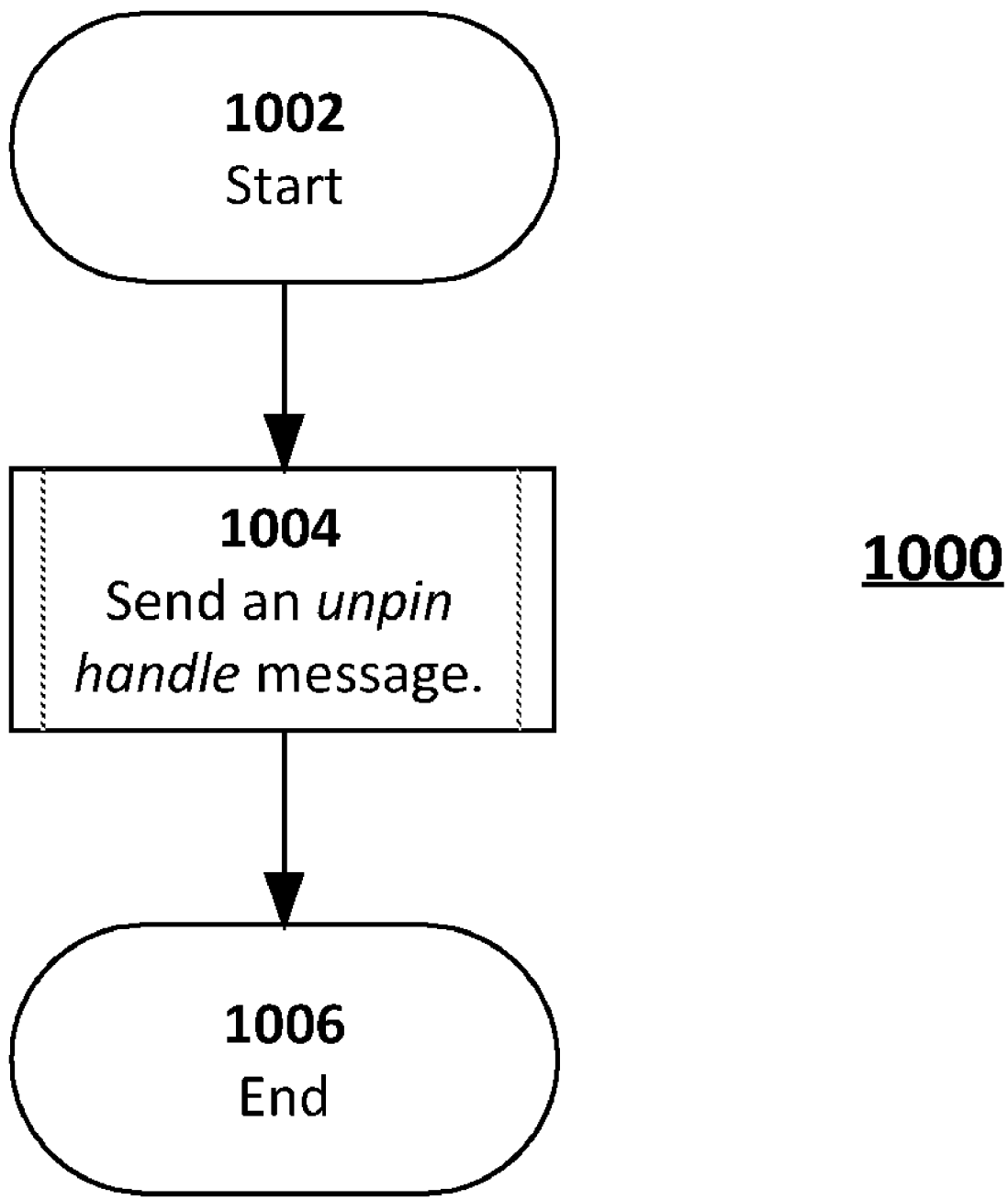
FIG. 10 is a flowchart showing "Unpin" function steps used to unpin a handle.

FIG. 10 is a flowchart showing "Unpin" function steps used to unpin a handle. "Unpin" function 1000 subroutine is initiated by Start step 1002. In step 1004, an unpin handle message is sent, then step 1006 is termination of the subroutine.

Figure 11:
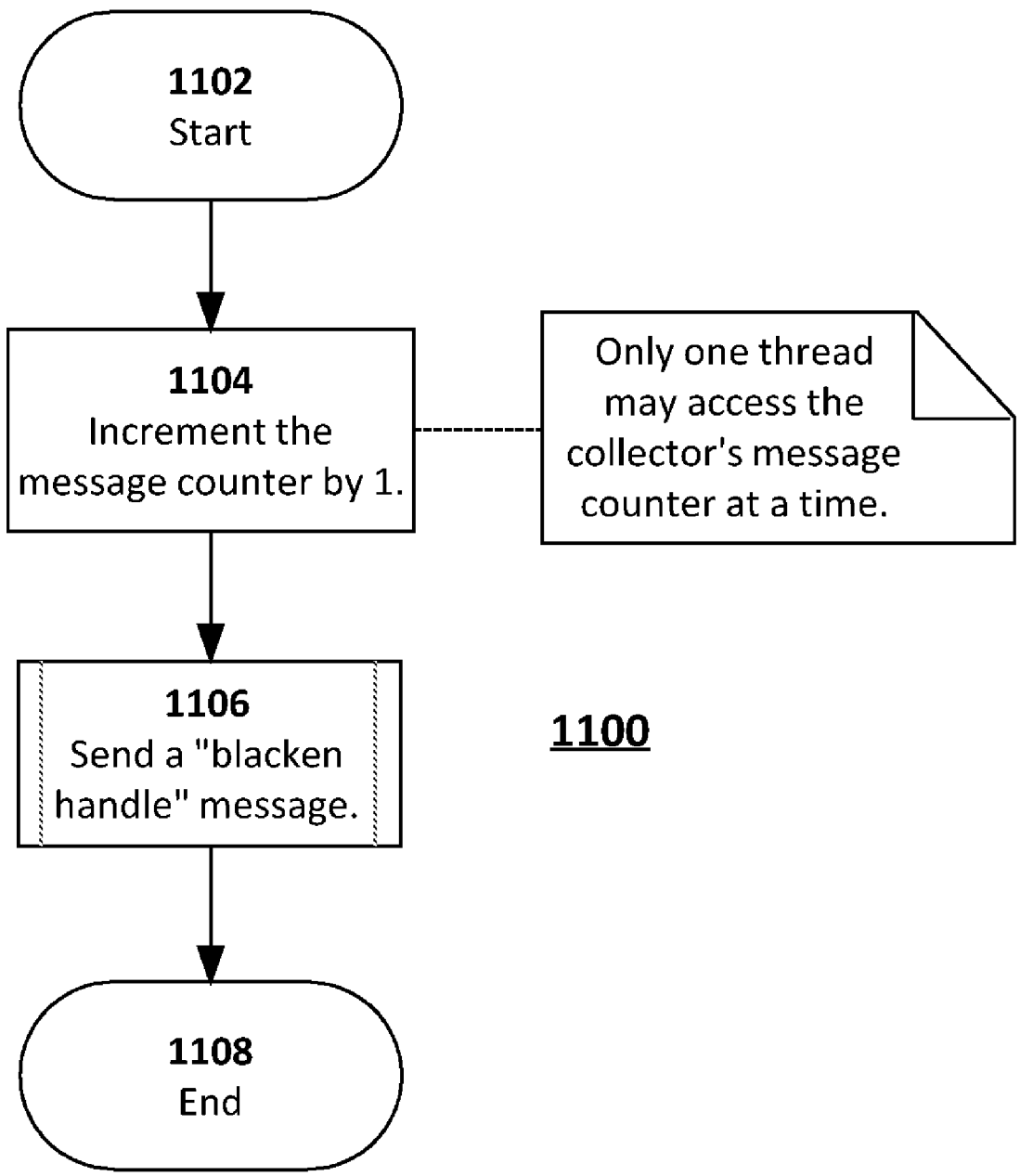
FIG. 11 is a flowchart showing "Identify" function steps used to identify a referenced handle.

FIG. 11 is a flowchart showing "Identify" function steps used to identify a referenced handle. "Identify" function 1100 subroutine is initiated by Start step 1102. In step 1104, the message counter is incremented by 1. NOTE: Only one thread may access the collector's message counter at a time. In step 1106, a "blacken handle" message is sent. Then step 1108 is termination of the subroutine.

Figure 12:
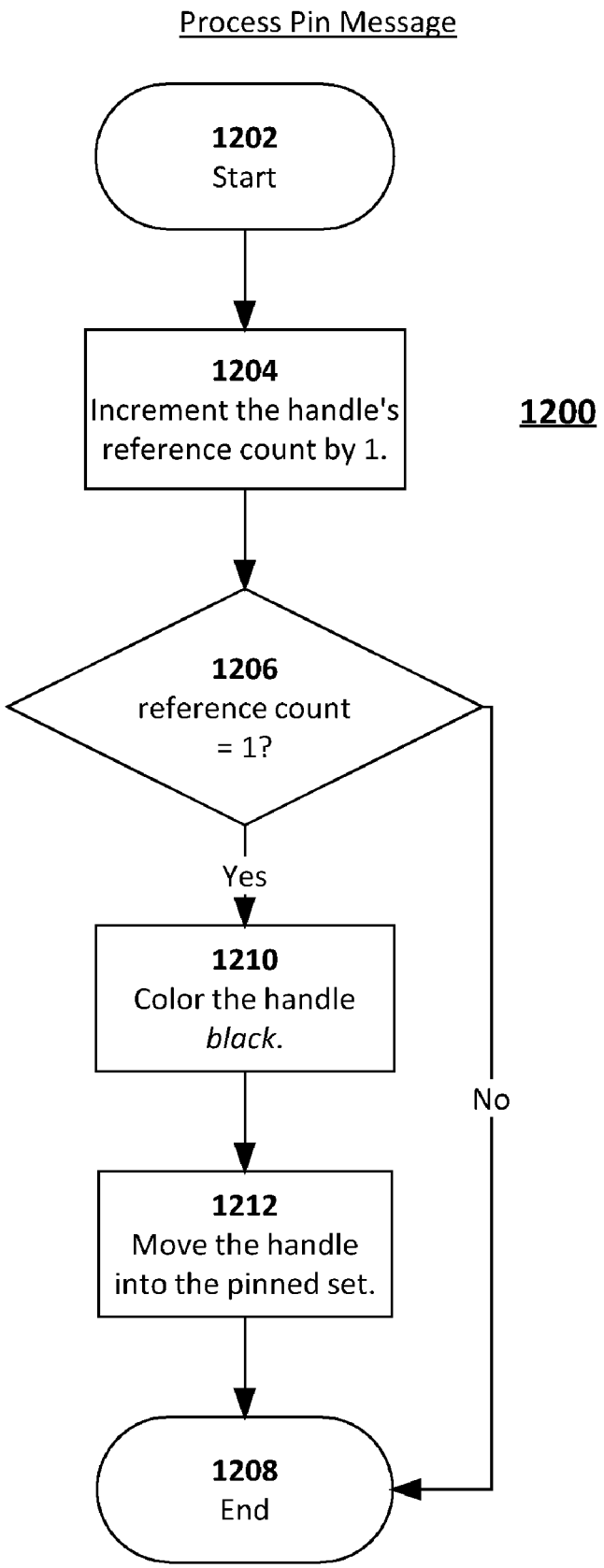
FIG. 12 is a flowchart showing the process "Pin" message and response steps used to pin a handle as identified in Table III.
Figure 15A:
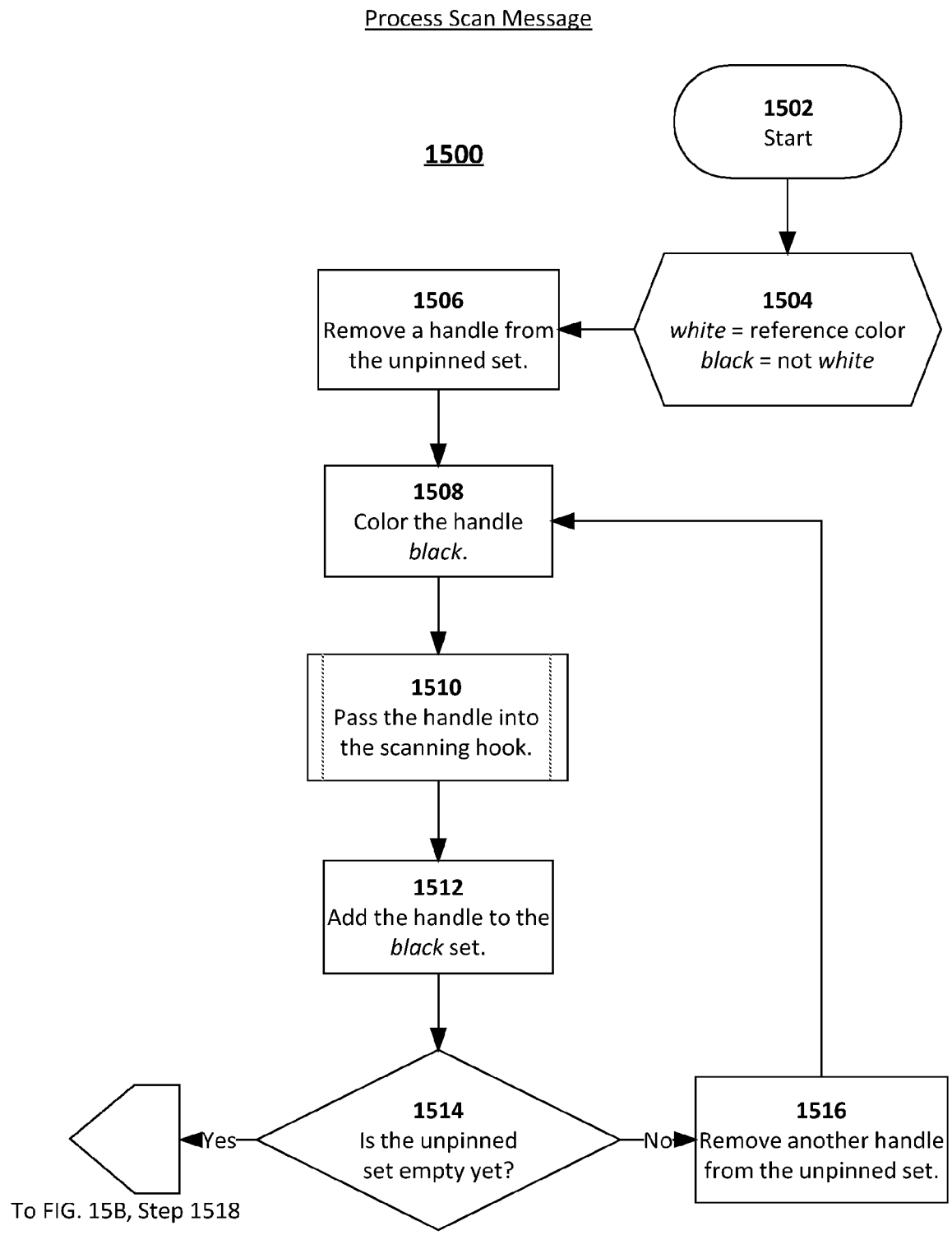
Figure 15B:
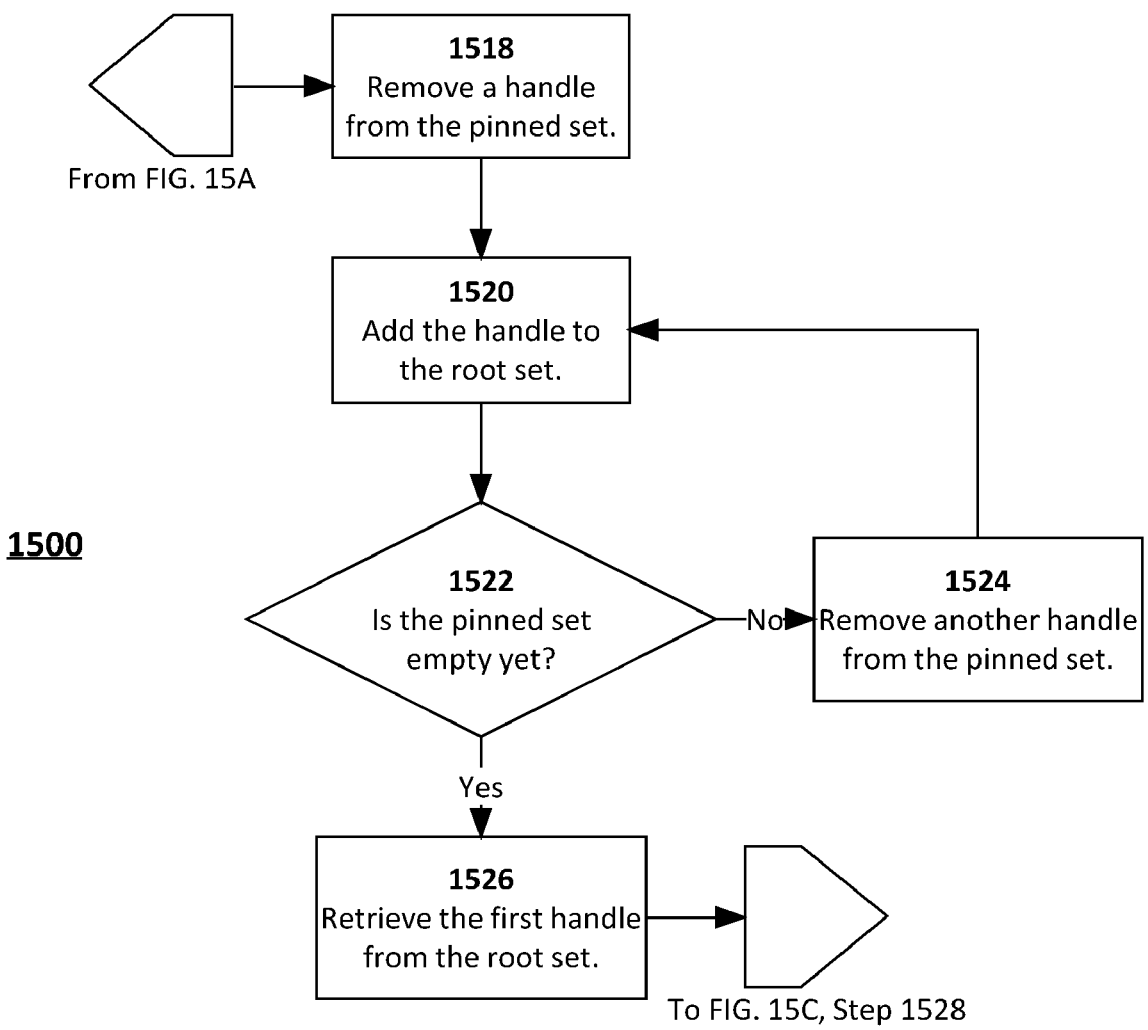

FIG. 12 is a flowchart showing the process "Pin" message and response steps used to pin a handle as identified in Table III. "Process Pin Message" function 1200 subroutine is initiated by Start step 1202. The handle's reference counter is incremented by 1 in step 1204. In step 1206, a query is made as to whether or not the reference count equals to 1. If the result of step 1206 is yes, it will proceed to step 1210 wherein the handle is colored black. Subsequently in step 1212, the handle is moved into the pinned set. Then step 1208 is termination of the subroutine. If the result of step 1206 is no, it will proceed directly to step 1208 to terminate the subroutine.

the reference color is inverted. NOTE: This has the effect of reversing the roles of the sets that hold black and white handles. The empty set that previously held white handles is now ready to hold black handles. The set that previously held black handles now holds white handles. Then in step 1406, white is assigned as the reference color and black is assigned the not white color. Then in step 1408, each handle in the pinned set is colored black. In step 1410, each handle in the unpinned set is colored black. Subsequently, each handle in the root set is colored black in step 1412. In step 1414, the collector's message counter is reduced by 1. NOTE: Only one thread may access the collector's message counter at a time. Then step 1416 is termination of the subroutine. FIGS. 15A, 15B and 15C collectively show a flowchart showing the process "Scan" message and response steps used to initiate the scan phase as identified in Table III. As shown in FIG. 15A, "Process Scan Message" function 1500 subroutine is initiated by Start step 1502. In step 1504, white is assigned as the reference color and black is assigned the not white color. The handle from the unpinned set is removed in step 1506. Then the handle is colored black in step 1508. In step 1510, the handle is passed into the scanning hook. Then in step 1512, the handle is added to the black set. In step 1514, a query is made as to whether or not the unpinned set is empty yet. If the result of step 1514 is no, another handle will removed from the unpinned set in step 1516 and the subroutine will then be looped back to step 1508. As best shown in FIGS. 15A and 15B, if the result of step 1514 is yes, it will proceed to step 1518 wherein a handle from the pinned set is removed. Subsequently in step 1520, the handle is added to the root set. As best shown in FIG. 15B, then in step 1522, a query is made as to whether or not the pinned set is empty yet. If the result of step 1522 is no, another handle from the pinned set is removed in step 1524 and the subroutine will then be looped back to step 1520. If the result of step 1522 is yes, it will proceed to step 1526 wherein the first handle from the root set is retrieved. As best shown in FIG. 15C, subsequently in step 1528, the handle is colored black and then in step 1530 the handle is passed into the scanning hook. Then in step 1532, a query is made as to whether or not there is another handle in the root set. If the result of step 1532 is yes, the next handle from the root set is retrieved in step 1534 and the subroutine will then be looped back to step 1528 wherein the handle is colored black. If the result of step 1532 is no, the collector's message counter is reduced by 1 in step 1536. NOTE: Only one thread may access the collector's message counter at a time. Then step 1538 is termination of the subroutine.

Figure 16:
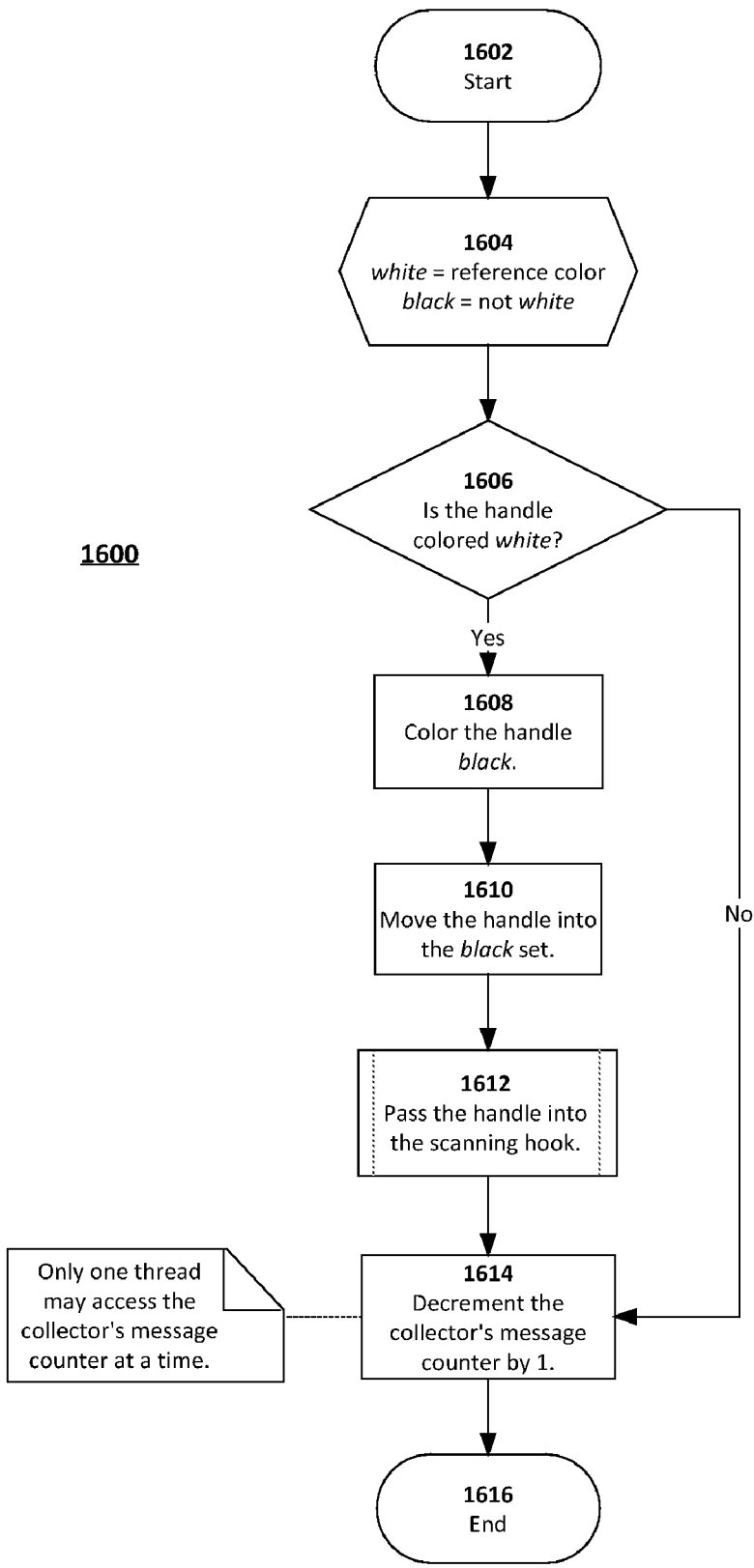
FIG. 16 is a flowchart showing the process "Blacken" message and response steps used to color a handle black and scan it as identified in Table III.

FIG. 16 is a flowchart showing the process "Blacken" message and response steps used to color a handle black and scan it as identified in Table III. "Process Blacken Message" function 1600 subroutine is initiated by Start step 1602. In step 1604, white is assigned as the reference color and black is assigned the not white color. In step 1606, a query is made as to whether or not the handle is colored white. If the result of step 1606 is yes, the handle is colored black in step 1608 and then the handle is moved into the black set in step 1610. In step 1612, the handle is passed into the scanning hook. Then the collector's message counter is reduced by 1 in step 1614. NOTE: Only one thread may access the collector's message counter at a time. The subroutine will be then be terminated in step 1616. However, if the result of step 1606 is no, it will proceed to directly to step 1614 wherein the collector's message counter is reduced by 1 and then the subroutine is terminated in step 1616.

Figure 17:
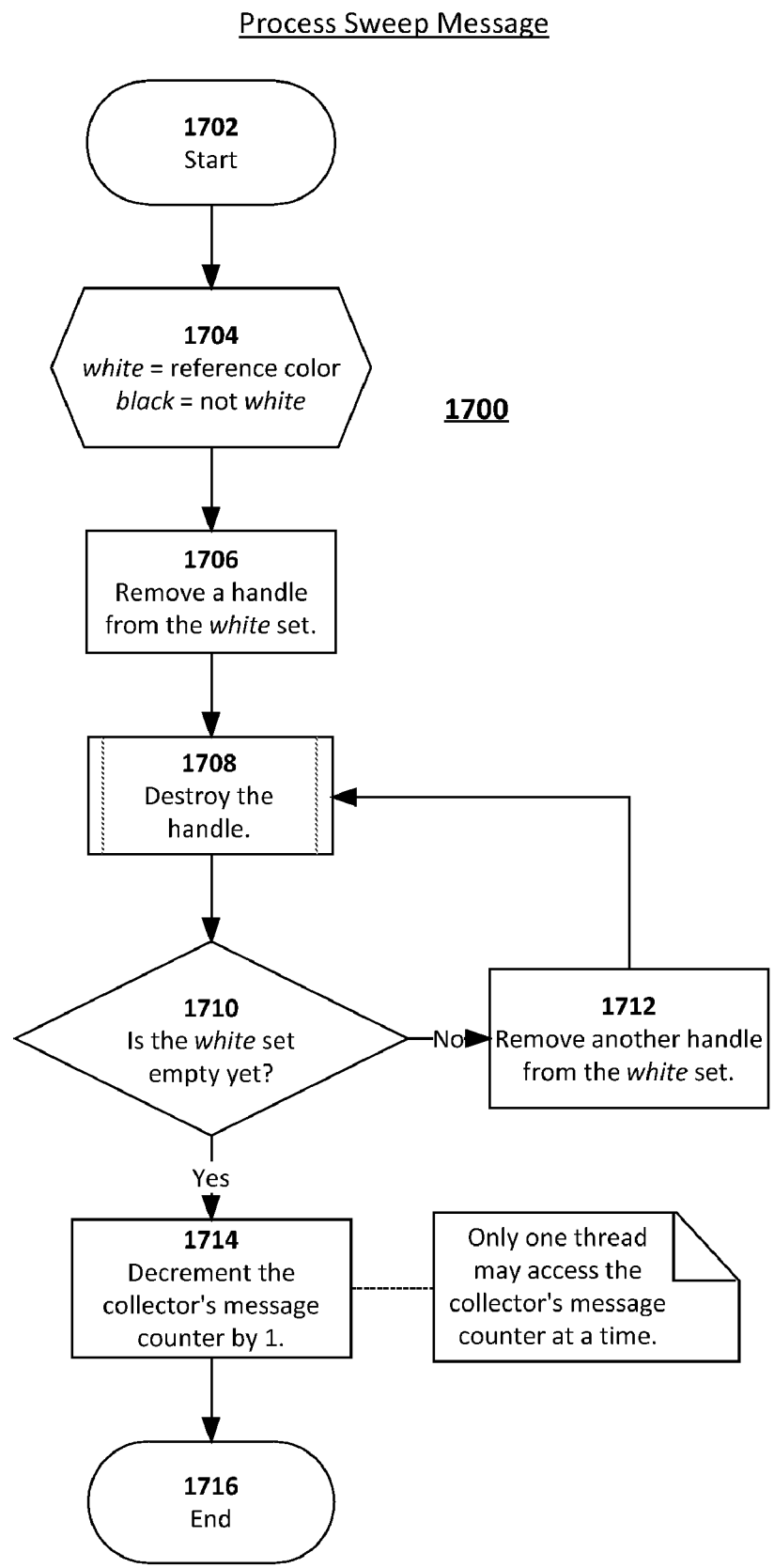
FIG. 17 is a flowchart showing the process "Sweep" message and response steps used to initiate the sweep phase as identified in Table III.

FIG. 17 is a flowchart showing the process "Sweep" message and response steps used to initiate the sweep phase as identified in Table III. "Process Sweep Message" function 1700 subroutine is initiated by Start step 1702. In step 1704, white is assigned as the reference color and black is assigned the not white color. Then in step 1706, a handle is removed from the white set. Subsequently the handle is destroyed in step 1708. In step 1710, a query is made as to whether or not the white set is empty yet. If the result of step 1710 is no, another handle from the white set is removed in step 1712 and the subroutine is looped back to step 1708 wherein the handle is destroyed. If the result of step 1710 is yes, the collector's message counter is reduced by 1 in step 1714. NOTE: Only one thread may access the collector's message counter at a time. The subroutine will be then be terminated in step 1716.

Figure 18:
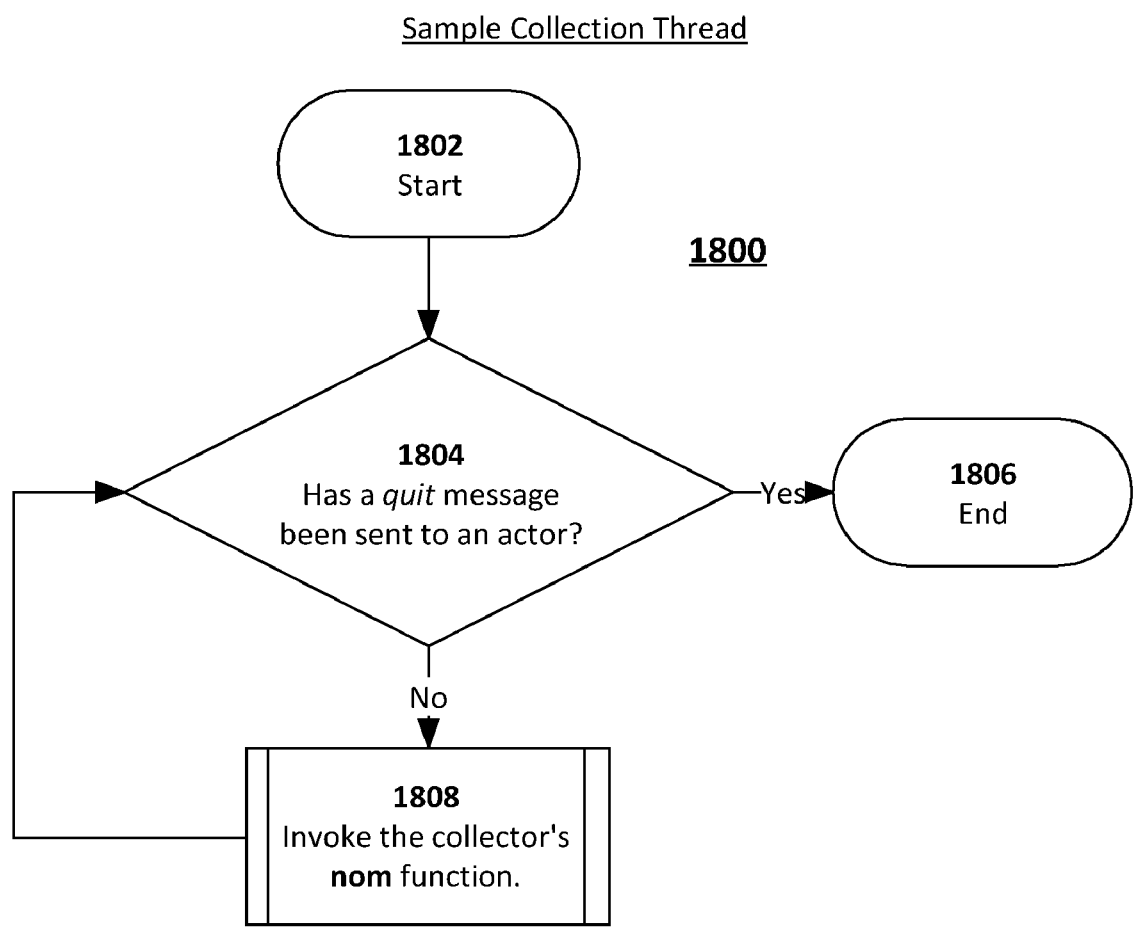
FIG. 18 is a flowchart showing "Sample Collection Thread" function steps.

FIG. 18 is a flowchart showing "Sample Collection Thread" function steps. It will be understood that in an implementation of the garbage collector 100 of the present invention, collection threads run in the background and collect garbage resources simultaneously with the operation of the application or computer program integrated with the collector 100. "Sample Collection Thread" function 1800 subroutine is initiated by start step 1802. In step 1804, a query is made as to whether or not a quit message has been sent to an actor. If the result of step 1804 is no, it will proceed to step 1808 wherein the collector's nom function is invoked and the process is looped back to step 1804. If the result of step 1804 is no, it will proceed directly to step 1806 to terminate the subroutine.

Figure 19:
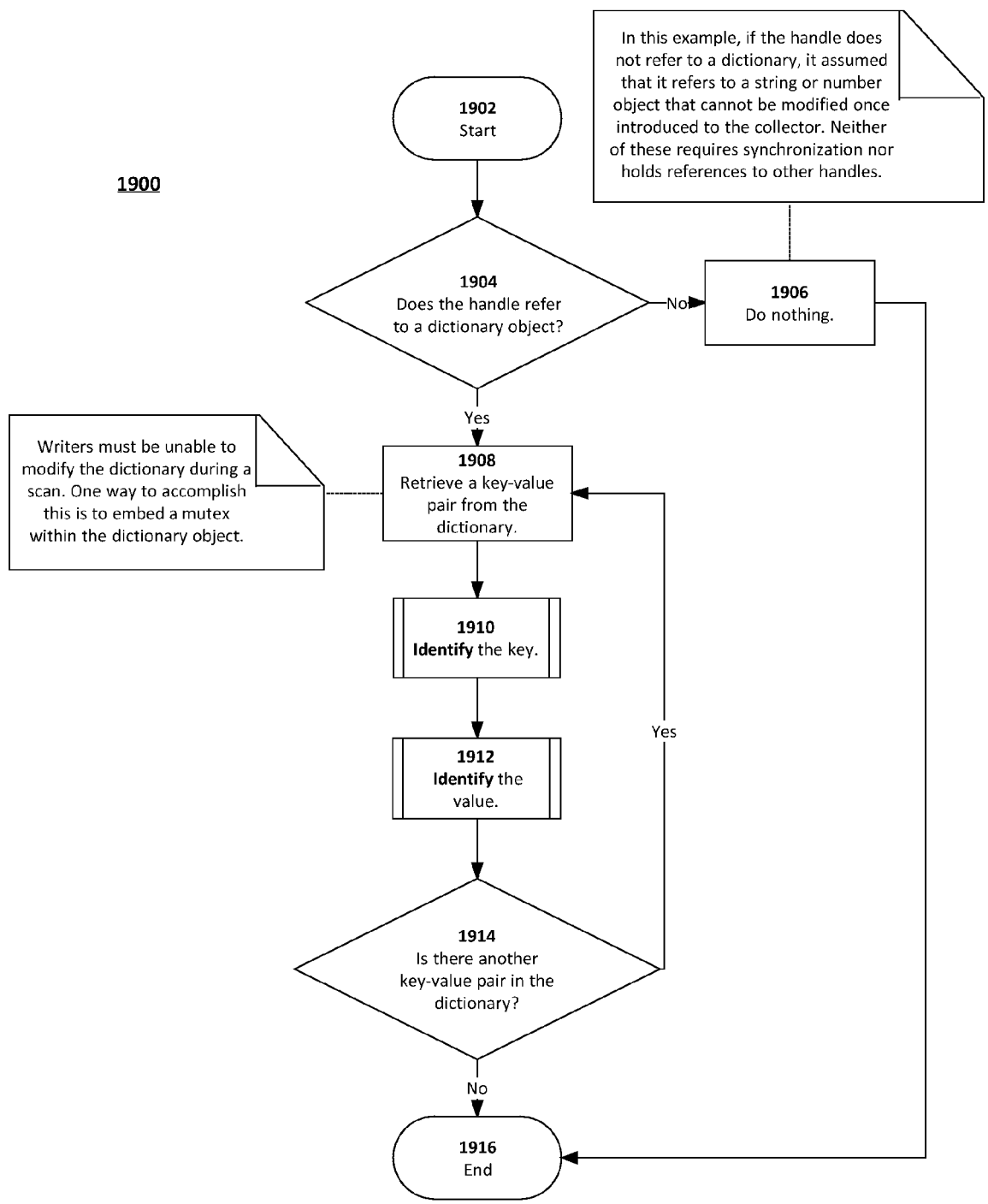
FIG. 19 is a flowchart showing "Sample Scan Function" function steps.

FIG. 19 is a flowchart showing "Sample Scan Function" function steps. "Sample Scan" function 1900 subroutine is initiated by start step 1902. In step 1904, a query is made as to whether or not the handle refers to a dictionary object. NOTE: The handle refers to a read-only string or number object, neither of which requires synchronization nor holds references to other handles. If the result of step 1904 is no, it will proceed directly to step 1914 to terminate the subroutine. If the result of step 1904 is yes, then step 1906 consists of retrieving the first key-value pair from the dictionary and proceeding to step 1908. NOTE: Writers must be restricted from modifying the dictionary during a scan (with a mutex, for example). In step 1908, the key is identified. Subsequently in step 1910, the value is identified. Then in step 1912, a query is made as to whether or not the there is another key-value pair in the dictionary. If the result of step 1912 is yes, it will loop the process back to step 1906 wherein the first key-value pair from the dictionary will be retrieve. If the result of step 1912 is no, it will proceed directly to step 1914 to terminate the subroutine.

Figure 20A:
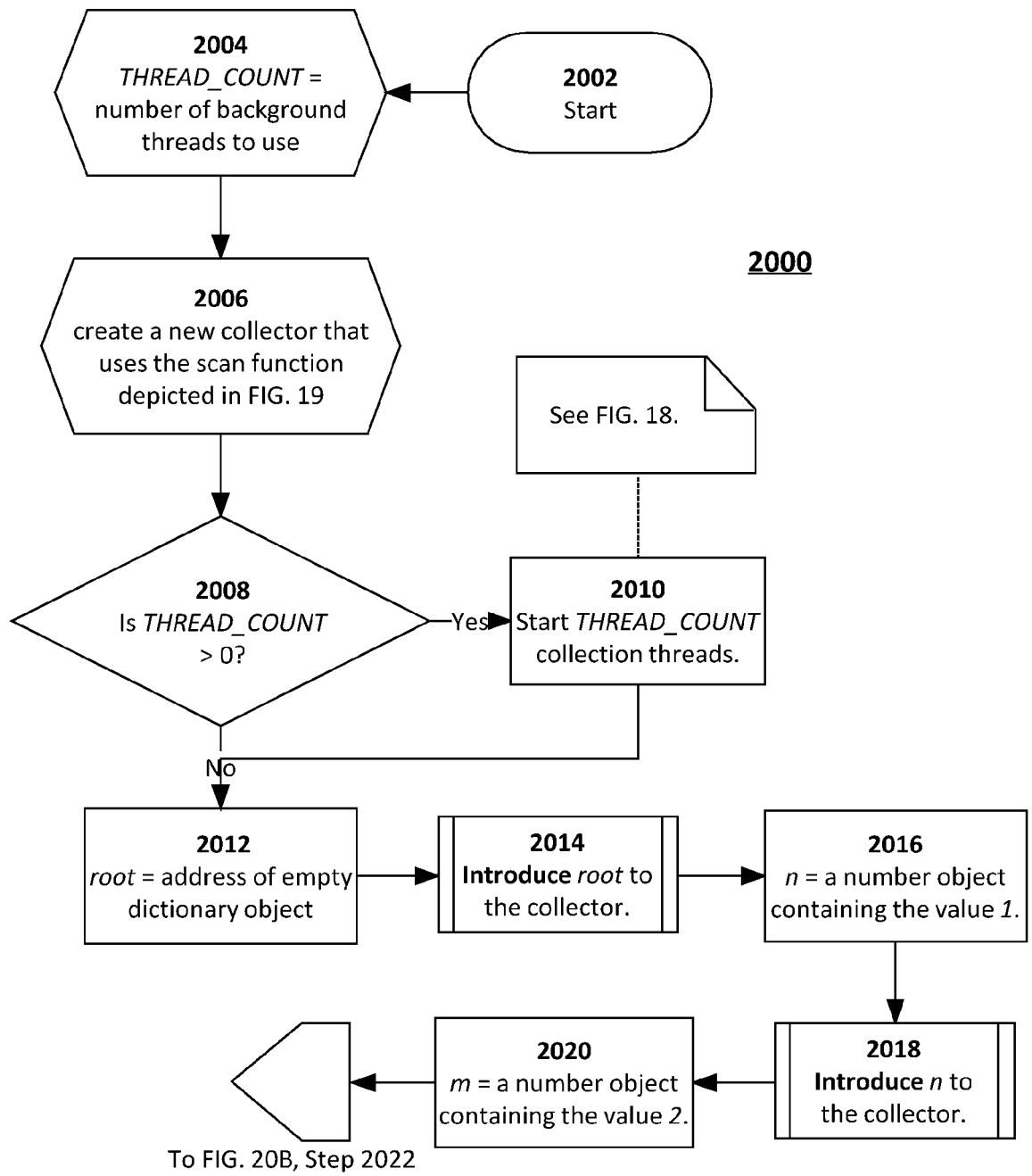
FIGS. 20A, 20B, 20C and 20D collectively show a flowchart showing "Sample Mutator" function steps.
Figure 20B:
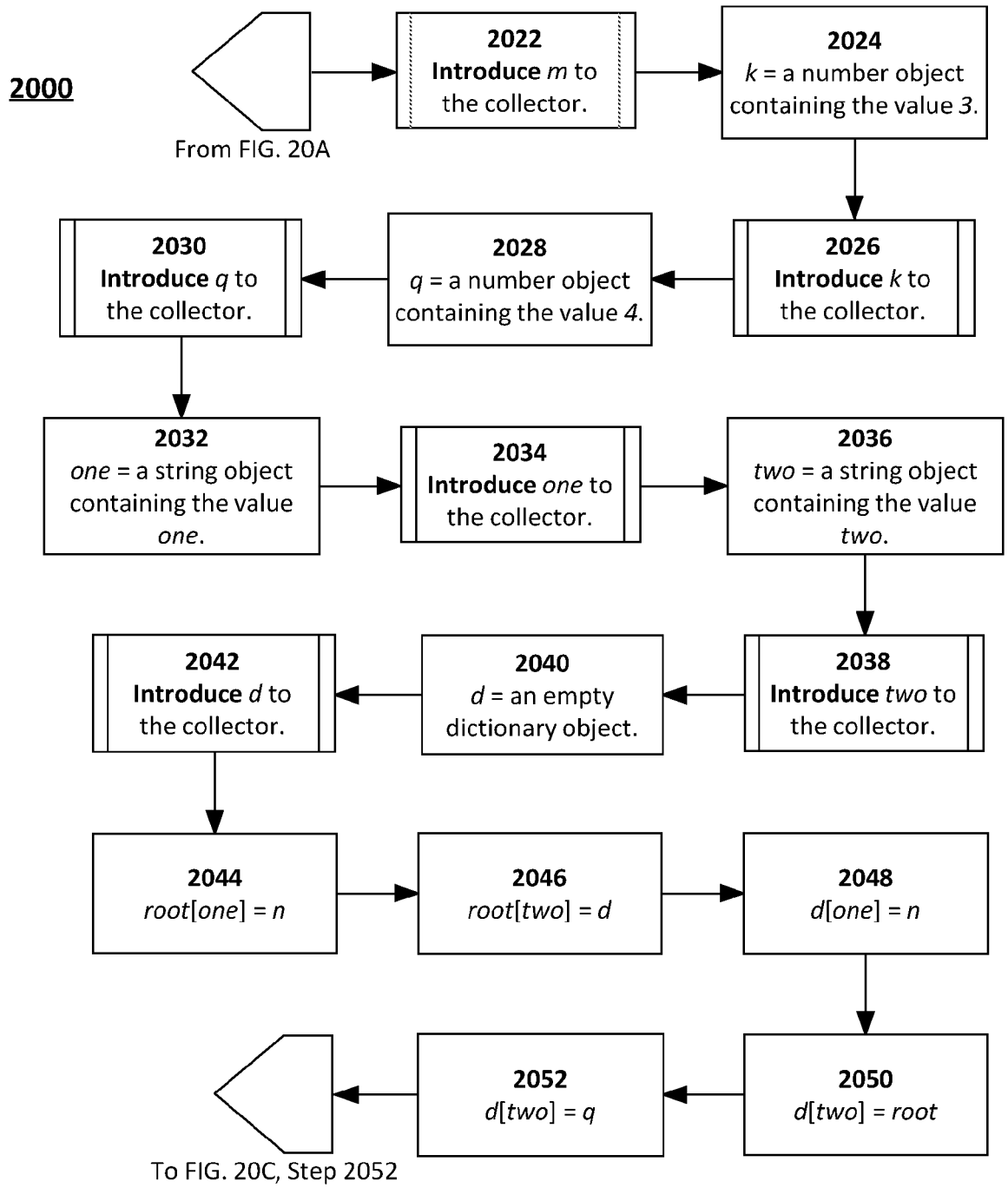
Figure 20C:
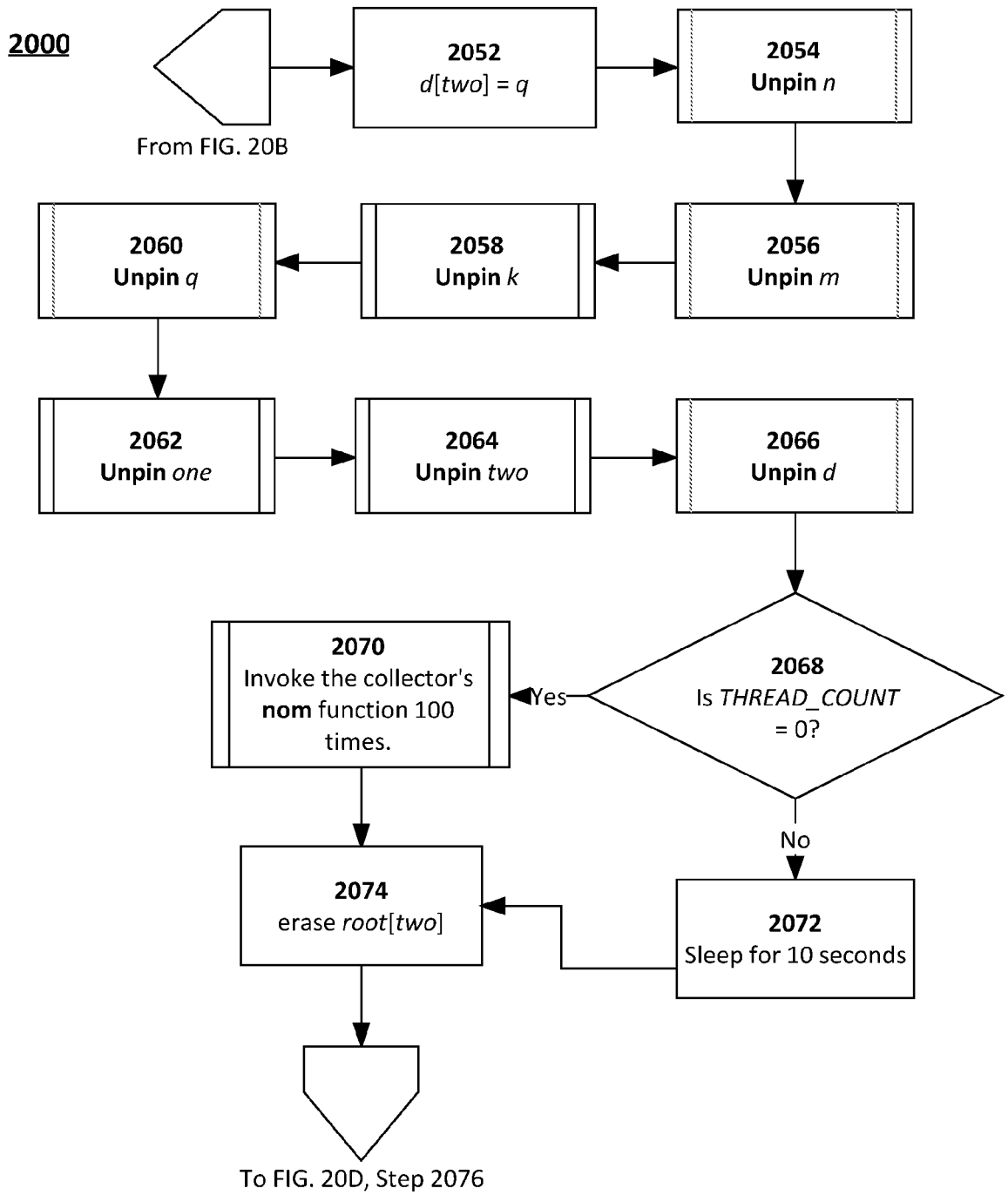

FIGS. 20A, 20B, 20C and 20D collectively show a flowchart showing "Sample Mutator" function steps. It will be understood that the garbage collector 100 of the present invention can be configured for different thread topologies. As best shown in FIG. 20A, "Sample Mutator" function 2000 subroutine is initiated by Start step 2002. In step 2004, the value of THREAD_COUNT is set to be equal to the number of background threads to use. Then in step 2006, a new collector is created using the "Sample Scan Function" 1900 as best shown in FIG. 19. Then in step 2008, a query is made as to whether or not the value of THEAD_COUNT is greater than zero. If the result of step 2008 is yes, i.e., if there are any threads to collect on, it will proceed to step 2010 wherein it will jump start the THREAD_COUNT collection by threads as best shown in FIG. 18. Again, collection by threads such as shown in FIG. 18 is a process which is asynchronous with the running of the application or computer program within which the collector 100 is integrated. If the result of step 2010 is no, i.e., if the number of threads is ZERO, the collector 100 will skip step 2012 and proceed directly to step 2012 in which the value of root is made equal to the address of empty dictionary object. In step 2014, root is introduced to the collector. In step 2016, n is set to be a number object containing the value 1. Then in step 2018, n is introduced to the collector. In step 2020, m is set to be a number object containing the value 2. Then it proceeds to step 2022 in FIG. 20B. As shown in FIG. 20B, in step 2022, m is introduced to the collector. Subsequently, in step 2024, k is set to be a number object containing the value 3. In step 2026, k is introduced to the collector. In step 2028, q is set to be a number object containing the value 4. In step 2030, q is introduced to the collector. Then in step 2032, one is set to be a string object containing the value one. In step 2034, one is introduced to the collector. In step 2036, two is set to be a string object containing the value two. In step 2038, two is introduced to the collector. In step 2040, d is set to be a an empty dictionary object. In step 2042, d is introduced to the collector. In step 2044, root [one] is set to be equal to n. Then in step 2046, root [two] is set to be equal to d. In step 2048, d[one] is set to be equal to n and in step 2050, d[two] is set to be equal to root. Then in step 2052, d[two] is set to be equal to +q. Then in proceed to step 2054 in FIG. 20C. As shown in FIG. 20C, in step 2054, n is unpinned. In step 2056, m is unpinned and in step 2058, k is unpinned. In step 2060, +q is unpinned and in step 2062, one is unpinned.

Figure 20D:
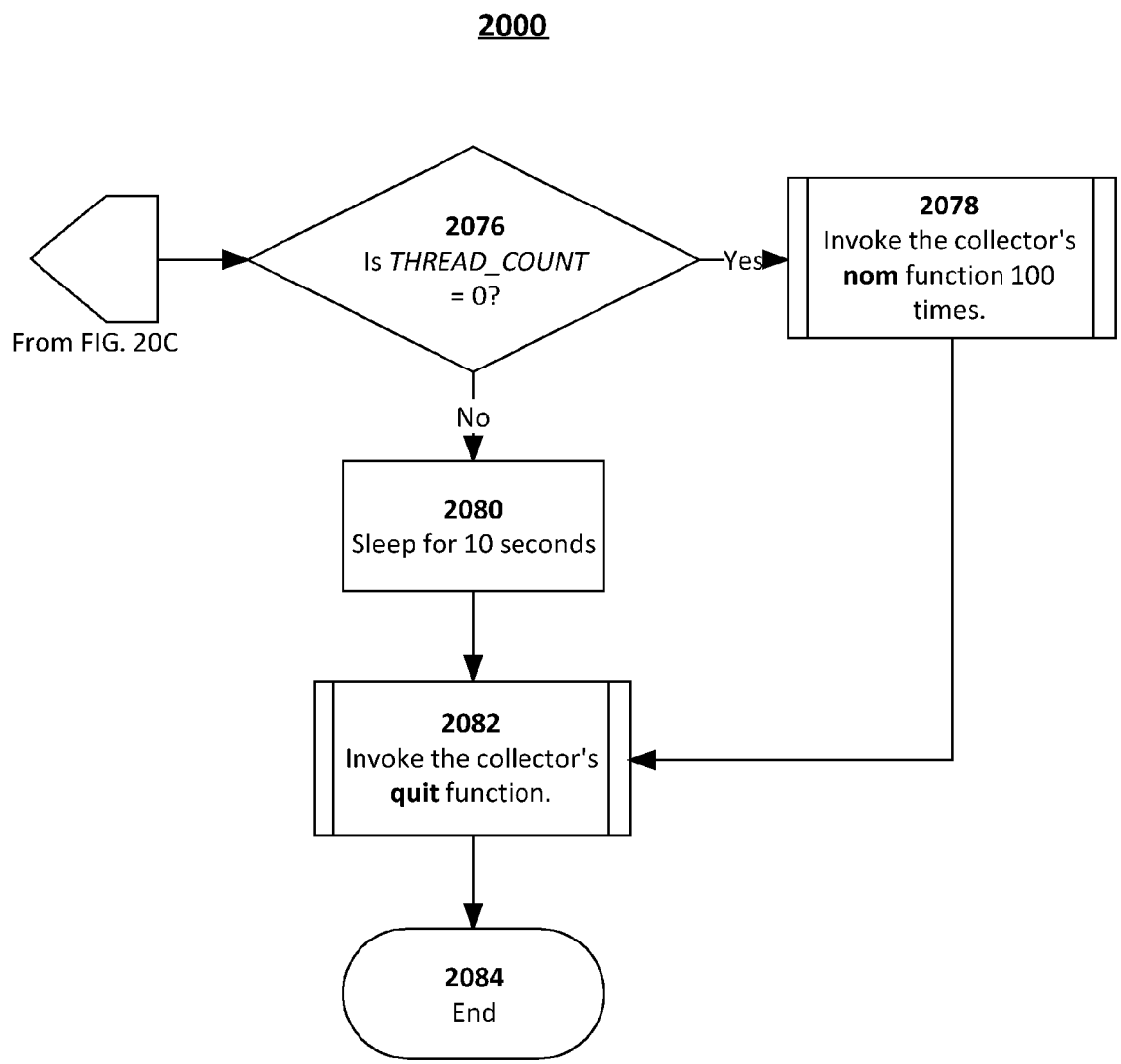

In step 2064, two is unpinned. In step 2066, d is unpinned. Subsequently in step 2068, a query is made as to whether or not the value of THEAD_COUNT is equal to zero. If the result of step 2068 is yes, it will proceed to step 2070 in which the collector's nom function is invoked 100 times. Then it will proceed to step 2074. If the result of step 2068 is no, it will proceed to step 2072 the process will be put to sleep for 10 seconds and then proceed to step 2074 also in which root [two] is erased. Subsequently it proceeds to step 2076 as best shown in FIG. 20D, in step 2076 a query is made as to whether or not the value of THEAD_COUNT is equal to zero. If the result of step 2076 is yes, it will proceed to step 2078 in which the collector's nom function is invoked 100 times. Then it will proceed to step 2082. If the result of step 2076 is no, it will proceed to step 2080 the process will be put to sleep for 10 seconds and then proceed to step 2082 also in which the collector's quit function is invoked. Then it will proceed directly to step 2084 to terminate the subroutine.

Figure 21:
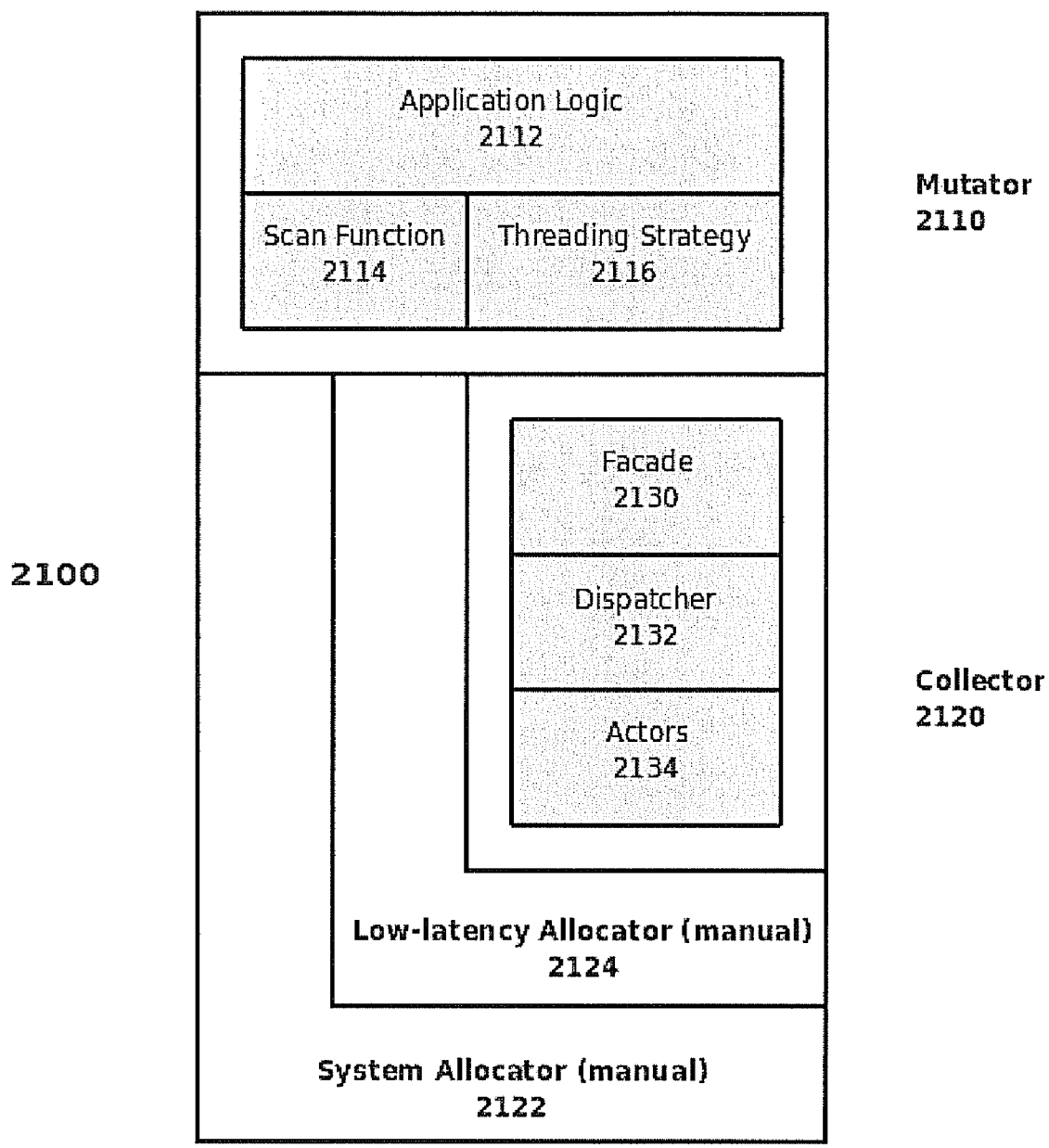
FIG. 21 is a block diagram showing the mutator and collector functions.

FIG. 21 is an overall block diagram 2100 showing the mutator 2110 and collector 2120 functions. As described above, the application or computer program 2112 that requires collection integrated with the collector 2120 is called the mutator 2110, and the programmer is the person that integrates the mutator 2110 with the collector 2120. The programmer decides the parameters of the scan function 2114 that scans the predetermined set of objects, as shown in either FIG. 15 or 19. The programmer also develops a threading strategy 2116, prior art examples of which are shown in FIG. 4.

Furthermore, collector 2120 is comprised of a lowest level operating system layer called the system allocator 2122. System allocator 2122 can be both allocate and free. It will further be understood that allocators in the diagram with manual memory management semantics can be labeled "manual" instead of "allocate and free". In embodiments of the present invention, allocate function can both allocate memory to needed resources, as well as free up memory where no longer needed. Low-latency allocator 2124 can be built off the system allocator 2122 and can be considered to be an intermediate level in the operating system. At higher levels of operating, the facade provides a function call by which a programmer can submit asychronous messages to a dispatcher routine 2132, which is where the correct actor and subroutine are selected to process the instructions called out by a programmer through the facade 2130, and actors, each which has a state and are where instructions called out by a programmer through the facade 2130 are implemented and executed in parallel.

Thus, the mutator 2110 comprises not only application logic 2112 which needs to be collected periodically or as desired, but so also scan function 2114 and threading strategy 2116, whereby integration of the application 2112 with the collector 2120 becomes possible.

It will be understood, as stated above, that the collector of the present invention also intends to satisfy real-time constraints of parallelized, incremental garbage collection. Optimization of the collector 100 to make it friendly to real-time collection processing could require changes or modifications, which changes and modifications are expressly included within the scope of the present invention. As an example, during the "bleach phase", a goal is to clean up objects and make them safe for reclamation. An embodiment of the present invention sends a message, reclaims each reclaimable object sequentially and in linear fashion. Furthermore, to optimize the collector to operate in real-time and eliminate the purely linear response, minor changes and/or modifications to the algorithm which are trivial and would be obvious to one skilled in the art would render the algorithm associated with the collector 100 of the present invention friendly to real-time as well as "soft" real-time processing.

As stated above, the collector of the present invention can be integrated into a language or virtual machine that uses garbage collection, for example JAVA, NET, or a CPU emulator. The collector of the present invention can be integrated through the interpreter or virtual machine or integrated directly into the program generated by a compiler.

Because this collector 100 algorithm is based on asynchronous messaging, which can be passed over the network, it can be applied to a distributed system with shared resources. The manner in which the resources, i.e., handles, are bound to actors is particularly suited for this because the algorithm does not require adding a load balancing algorithm, i.e., an algorithm that moves resources around to eliminate unbalanced load on the system. It will be understood that such load-balancing algorithm would increase complexity and be performance prohibitive in distributed systems. In short, the algorithm can be applied to a distributed computer program without much modification. Databases would fall into this category.

As discussed, garbage collectors can be adapted to improve the performance of programs that were not designed to be used with a collector. Traditionally, this has applied to a small subset of programs due to the unsuitability of collectors for parallelism, large heaps, and real-time constraints. The garbage collector 100 of the present invention can be adapted to improve the reliability of a separate program that was not designed to be used with a collector. Products like this have existed in the past, but are of limited use for multithreaded applications because of the performance cost, which the present algorithm eliminates.

Thus, it will be understood that garbage collectors can be adapted to detect memory leaks in a separate program that was not designed to be used with a collector. Several prior art products, such as IBM Rational's Purify (trademark) use this technique. However, the lack of a parallel, incremental collector degrades performance to the point where these tools are less useful than they could be if the parallelism didn't have to be serialized.

It will be understood that an aspect of the invention, such as in a prototype or for use in developing and operating the algorithm, is the logger. It is not part of the collector algorithm, however in an embodiment it is the tool which can be used to diagnose flaws in the algorithm. The logger is a debugging tool which makes a record or log of what the collector did. The logger can be synchronized or non-synchronized with the computer program and/or the collector.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A method for garbage collection in which resources used by data objects in a multi-threaded computer program that are not accessed in the future are reclaimed, the method comprising the following steps:

Providing a tracing garbage collector which is both parallelized and incremental;

Integrating the garbage collector with a mutator in a computer program, the mutator being the portion of the program that produces data objects in memory to be scanned by the collector for resources that are not accessed in the future and are therefore reclaimable;

Using two or more threads within a memory space that is shared with the mutator to simultaneously scan for and collect unused resources, the mutator being integrated with the collector so that they exist on the same thread, thus guaranteeing that collector processing is interleaved with mutator processing;

Sharing one or more threads used by the mutator with the collector for the purpose of scanning and collecting unused resources;

Dividing the collector's state between two or more threads that scan for and collect unused resources;

Interleaving the collector portion's scanning and collection with unrelated processing by the computer program such that a thread of mutator processing is interrupted frequently for small periods of time instead of being interrupted by the collector relatively infrequently for potentially long periods of time;

Using two or more colors in the representation of a potentially collectible resource's state to facilitate scanning for and collecting unused resources;

Initiating and maintaining a counter of outstanding unprocessed messages during a given phase such that when the counter reaches zero, the collector sends the message that starts a next phase, this counter shared between threads and synchronized;

Each actor maintaining a subset of handles that have been introduced into the collector, wherein within this subset, the actor maintains several subsets that categorize the collection state of the handle, such that a handle cannot belong to multiple sets, and being individually bound to a specific actor, a handle moves from set to set passively as related messages are processed and the handle's associated collection state changes; and Serializing access to the collector's state in such a manner that preserves the integrity of the collector's state without requiring all mutator threads to be stopped simultaneously for any portion of a collection cycle.

2. The method of claim 1 in which the garbage collector is adapted for use in computer programs utilizing various thread topology, thus not imposing any constraints upon the thread topology of the computer program it is integrated into.

3. The method of claim 2 in which the mutator calls an incremental processing function offered by the garbage collector, while the mutator processes an allocation or any other operation it performs with regularity, interleaving collector processing with that of the mutator on the same thread or processor.

4. The method of claim 2 in which the mutator calls an incremental processing function offered by the garbage collector, while the mutator is sleeping, waiting, idling, or spinning, thus not doing any other processing.

5. The method of claim 2 in which the mutator calls an incremental processing function offered by the garbage collector, from within a loop on one or more threads in the computer program.

6. The method of claim 1 in which the collector minimizes synchronization.

7. The method of claim 6 in which synchronization of the collector is limited to queue operations, a single counter shared between threads, and a hook whose synchronization needs, if any, are dependent upon the mutator's needs.

8. The method of claim 1 in which the collector can be used with any allocator that uses common allocate and deallocate semantics.

9. The method of claim 1 in which the collector can be combined with an optimized allocator to address issues including but not limited to memory fragmentation and resource allocation latency.

10. The method of claim 1 in which the collector is portable to any platform that supports simple synchronization primitives such as but not limited to mutexes.

11. The method of claim 1 in which a basic interface which the collector exposes to a programmer comprises the following functions:

Introduction function which introduces a handle to the collector, such that the collector initializes the handle's collection state and pins an object and the programmer is expected to unpin the handle when it is known to be referenced by another handle that is already known to the collector;

Quit function which shuts down the collector, such that the collector sends a quit message to each actor;

Nom function which collects incrementally, such that if an actor is on a ready queue, a contextual thread is allowed to process a single message and if no outstanding messages remain in a current phase, send a message that initiates a next phase to each actor;

Pin function which pins a handle, such that the collector sends a pin message to each actor that the handle is bound to;

Unpin function which unpins a handle, such that the collector sends an unpin message to the actor that the handle is bound to; and Identify function which is only intended to be called by the scanning hook and which identifies a referenced handle, such that the collector sends a blacken message to the actor the handle is bound to.

12. The method of claim 11 in which the interface of the collector with the computer program utilizes an algorithm which collects handles, handles representing objects in memory that are potentially collectible.

13. The method of claim 12 in which a handle is defined as the address of a structure in memory whose definition is well known to the programmer.

14. The method of claim 13 in which pinned handles are considered noncollectible and use a reference counter to determine how long a handle should be pinned.

15. The method of claim 14 in which introduction of a new handle to the collector produces a pinned handle in order to reference the object for a first time, thus avoiding it being identified as an immutable object prematurely.

16. The method of claim 15 in which the programmer is responsible for unpinning the handle once it is referenced by another handle known to be mutable.

17. The method of claim 14 in which the programmer can also request that the collector pin or unpin handles.

18. The method of claim 14 in which at least one handle must be pinned for the collector to function.

19. The method of claim 11 in which the programmer is responsible for providing associated storage for a handle's color, reference count, and for an additional value that aids the collector in binding a handle to an arbitrary message processor, the means through with these associations are made being defined by the programmer according to the needs of the mutator.

20. The method of claim 11 in which the programmer supplies an implementation of a scanning hook that determines how the collector is to discover mutable handles given a handle that is already known to be mutable or uncollectible, this function being thread-safe, that is the collector must be able to scan the handle's associated data for references without the danger of the data being simultaneously changed to by another thread, wherein the collector does not write so read-only data requires no synchronization.

21. The method of claim 11 in which implementation of the collector uses a two-color system to find immutable objects in which at the beginning of a collection cycle, white objects are not known to be mutable or immutable, as the collector traverses a graph of mutable objects they are colored black as they are discovered, and at the end of a cycle handles that are still white are considered immutable and are scheduled to be collected.

22. The method of claim 11 in which each collection cycle is divided into the following three sequential phases, the transition between each phase being synchronized between two or more threads that scan for and collect unused resources in a computer program:
   In a bleach phase, actors prepare their handles for a new collection cycle by coloring all handles that are not known to be uncollectible to the color white;
   In a scan phase, each actor scans handles for references to other handles beginning with their respective root sets, coloring each handle discovered black; and
   In a sweep phase, since all mutable handles have been colored black, any handle that is still colored white is collected, wherein once the sweep phase of a cycle is complete, the collector begins with the bleach phase of the next cycle.

23. The method of claim 22 in which the collector divides work between specialized processing units called actors, which communicate through message passing such that an actor with a message in its queue is placed on the ready queue, and when a any thread wishes to devote a small amount of time to collection, it invokes the nom function, which pulls a single actor off of the ready queue and processes the message in the actor's queue, whereby collection can be performed incrementally, one message at a time if necessary, at the discretion of the mutator.

24. The method of claim 23 in which the collector maintains a count of outstanding unprocessed messages during a given phase, such that when this counter reaches zero, the collector knows to send a message that starts the next phase, whereby this counter must be shared between threads and must therefore be synchronized and whereby the production and consumption of "pin" and "unpin" messages does not affect the value of this counter because they can be sent during any phase of the collection cycle.

25. The method of claim 24 in which each actor is assigned a unique number that is used to bind handles to it, and the collector binds a handle to a specific actor for the lifetime of an object so that all messages with respect to that handle will be dispatched to the same actor, whereby operations on the same handle will be serialized without the use of handle-specific synchronization objects and permits the use of passive operations where messaging would otherwise be necessary and the collector uses a random number generator to bind handles to actors, and further comprising a sufficiently high-quality random number generator, whereby the collector also maintains a uniform distribution of handles across all of its actors, independent of mutator's memory allocation patterns.

26. The method of claim 25 in which each actor maintains a reference color which is a record of the most recent value used to represent the color white, wherein this value is a single bit that alternates between 1 and 0 from collection cycle to collection cycle as part of the bleach phase.

27. The method of claim 26 in which each actor maintains a subset of handles that have been introduced into the collector from potentially any location in the mutator, wherein within this subset the actor maintains several subsets that categorize the collection state of the handle such that there are two sets of handles that represent colored objects that do not have a special collection state and such that three sets are used to track handles with a special state, wherein those three sets include a root set, a recently pinned set, and a recently unpinned set, wherein a handle cannot belong to multiple sets, and being individually bound to a specific actor, moves from set to set passively as related messages are processed and the handle's associated collection state changes.

28. A multi-threaded computer program recorded on a non-transitory, computer-readable medium that uses parallelized, incremental garbage collector in which resources used by data objects in the multi-threaded computer program that are not accessed in the future are reclaimed and that does not stop the world to collect resources, the program consisting of the following steps:
   Providing a tracing garbage collector which is both parallelized and incremental
   Integrating the garbage collector with a mutator in a computer program, the mutator being the portion of the program that produces data objects in memory to be scanned by the collector for resources that are not accessed in the future and are therefore reclaimable;
   Using two or more threads within a memory space that is shared with the mutator to simultaneously scan for and collect unused resources, the mutator being integrated with the collector so that they exist on the same thread, thus guaranteeing that collector processing is interleaved with mutator processing;
   Sharing one or more threads used by the mutator with the collector for the purpose of scanning and collecting unused resources;
   Dividing the collector's state between two or more threads that scan for and collect unused resources;
   Interleaving the collector portion's scanning and collection with unrelated processing by the computer program such that a thread of mutator processing is interrupted frequently for small periods of time instead of being interrupted by the collector relatively infrequently for potentially long periods of time;
   Using two or more colors in the representation of a potentially collectible resource's state to facilitate scanning for and collecting unused resources;
   Initiating and maintaining a counter of outstanding unprocessed messages during a given phase such that when the counter reaches zero, the collector sends the message that starts a next phase, this counter shared between threads and synchronized;
   Each actor maintaining a subset of handles that have been introduced into the collector, wherein within this subset, the actor maintains several subsets that categorize the collection state of the handle, such that a handle cannot belong to multiple sets, and being individually bound to a specific actor, a handle moves from set to set passively as related messages are processed and the handle's associated collection state changes; and Serializing access to the collector's state in such a manner that preserves the integrity of the collector's state without requiring all mutator threads to be stopped simultaneously for any portion of a collection cycle.

29. The computer program of claim 28 wherein the collector is implemented with a asynchronous messaging.

30. The computer program of claim 29 wherein the program comprises distributed messages which are transported over a network, with the purpose of collecting unused resources for a distributed cluster.

31. The computer program of claim 30 wherein the collector divides resources into sets in a manner that eliminates the need to perform dynamic load balancing on the contents of each set, thereby reducing the amount of messaging that needs to occur.

32. The computer program of claim 28 wherein the collector is used to collect resources internal to the program.

33. The computer program of claim 28 wherein the collector is used to collect resources for another program that uses manual memory management.

34. The computer program of claim 33 wherein the purpose of the collector is to report memory errors such as leaks in another program that uses manual memory management.

35. The computer program of claim 33 wherein the purpose of the collector is to correct memory errors such as leaks in another program that uses manual memory management.

36. The computer program of claim 33 wherein the purpose of the collector is to the improve performance of another program.

37. The computer program of claim 28 wherein the collector is integrated through explicit implementation within or invocation from within the program's code.

38. The computer program of claim 28 wherein the collector is integrated through code generated by a compiler or code generator, without any program-specific analysis needed to determine what memory is shared between threads.

39. The computer program of claim 28 wherein the purpose of the collector is to collect unused resources for an interpreter, virtual machine, or language runtime such as JAVA, .NET, or a CPU emulator.

40. The computer program of claim 28 wherein the purpose of the collector is to collect immutable resources within a database, such as but not limited to, a file system, an RDBMS, an OODB, or NoSQL database.

41. The computer program of claim 28 wherein the program has soft real-time or real-time constraints and the collector does not violate these constraints.

* * * * *